United States Patent
Ryoo et al.

(10) Patent No.: US 10,142,299 B2
(45) Date of Patent: *Nov. 27, 2018

(54) SECURITY KEY GENERATION AND MANAGEMENT METHOD OF PDCP DISTRIBUTED STRUCTURE FOR SUPPORTING DUAL CONNECTIVITY

(71) Applicant: Samsung Electronics Co., Ltd., Suwon-si, Gyeonggi-do (KR)

(72) Inventors: Sun-Heui Ryoo, Yongin-si (KR); Soeng-Hun Kim, Suwon-si (KR); Jung-Soo Jung, Seongnam-si (KR); Jung-Min Moon, Seoul (KR); Anshuman Nigam, Suwon-si (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,633

(22) Filed: Feb. 13, 2018

(65) Prior Publication Data

US 2018/0183767 A1 Jun. 28, 2018

Related U.S. Application Data

(63) Continuation of application No. 14/910,580, filed as application No. PCT/KR2014/007312 on Aug. 7, 2014, now Pat. No. 9,930,016.

(30) Foreign Application Priority Data

Aug. 9, 2013 (KR) .................. 10-2013-0094952

(51) Int. Cl.
*H04M 1/66* (2006.01)
*H04M 1/68* (2006.01)
(Continued)

(52) U.S. Cl.
CPC ........ *H04L 63/0428* (2013.01); *H04L 63/062* (2013.01); *H04W 12/02* (2013.01); *H04W 12/04* (2013.01); *H04W 36/0038* (2013.01)

(58) Field of Classification Search
CPC .. H04L 63/0428; H04L 63/062; H04W 12/02; H04W 12/04
See application file for complete search history.

(56) References Cited

U.S. PATENT DOCUMENTS

2009/0220087 A1* 9/2009 Brusilovsky .......... H04L 63/062
380/272
2011/0122843 A1* 5/2011 Iwamura ............... H04W 12/04
370/331
(Continued)

FOREIGN PATENT DOCUMENTS

CN 102958052 A 3/2013
CN 103188663 A 7/2013
(Continued)

OTHER PUBLICATIONS

3GPP TS 36.300 V11.5.0, Overall description, Mar. 2013, Sophia Antipolis, France.
(Continued)

*Primary Examiner* — Moustapha Diaby
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for communicating by a user equipment with a macro cell base station and a small cell base station in a communication system is provided. The method comprises applying a first base station security key to a first communication link with the macro cell base station; generating a second base station security key to be used for a second communication link
(Continued)

with the small cell base station based on the first base station security key; applying the second base station security key to the second communication link with the small cell base station; and communicating through at least one of the first communication link and the second communication link.

22 Claims, 17 Drawing Sheets

(51) Int. Cl.
*H04M 3/16* (2006.01)
*H04L 29/06* (2006.01)
*H04W 12/04* (2009.01)
*H04W 12/02* (2009.01)
*H04W 36/00* (2009.01)

(56) References Cited

U.S. PATENT DOCUMENTS

| | | | |
|---|---|---|---|
| 2011/0124358 A1 | 5/2011 | Iwamura et al. | |
| 2011/0294508 A1* | 12/2011 | Min | H04W 76/19 455/436 |
| 2012/0005731 A1 | 1/2012 | Lei et al. | |
| 2012/0008776 A1* | 1/2012 | Ishida | H04W 12/04 380/247 |
| 2012/0033815 A1 | 2/2012 | Kuo | |
| 2013/0070731 A1* | 3/2013 | Lim | H04W 36/00 370/331 |
| 2013/0129091 A1 | 5/2013 | Kang et al. | |
| 2014/0242946 A1 | 8/2014 | Wu | |
| 2014/0308921 A1 | 10/2014 | Zhang | |
| 2016/0021581 A1* | 1/2016 | Deenoo | H04W 48/16 370/331 |

FOREIGN PATENT DOCUMENTS

| | | |
|---|---|---|
| KR | 10-2010-0127858 A | 12/2010 |
| KR | 10-2011-0130782 A | 12/2011 |
| KR | 10-2012-0138063 A | 12/2012 |
| KR | 10-2013-0054911 A | 5/2013 |

OTHER PUBLICATIONS

3GPP TS 33.401 V8.6.0, 3GPP System Architecture Evolution {SAE}, Security architecture, Dec. 2009, Sophia Intipolis, France.
Ericsson, ST_ERICSSON; 3GPP TSG-RAN WG2 #82, 'Security in Dual Connectivity'; Fukuoka, Japan, May 20-24, 2013; R2-131671.
Chinese Office Action dated Jun. 5, 2018. Chinese Patent Application No. 201480049729.6 and Issuing No. 20180553101781380.

* cited by examiner

SECURITY KEY GENERATION AND MANAGEMENT METHOD OF PDCP DISTRIBUTED STRUCTURE FOR SUPPORTING DUAL CONNECTIVITY

CROSS-REFERENCE TO RELATED APPLICATION(S)

This application is a continuation application of prior application Ser. No. 14/910,580, filed on Feb. 5, 2016, which is a U.S. National Stage application under 35 U.S.C. § 371 of an International application filed on Aug. 07, 2014 and assigned application number PCT/KR2014/007312, which claimed the benefit of a Korean patent application filed on Aug. 9, 2013 in the Korean Intellectual Property Office and assigned Serial number 10-2013-0094952, the entire disclosure of each of which is hereby incorporated by reference.

TECHNICAL FIELD

The present disclosure relates to wireless communications. More particularly, the present disclosure relates to methods and apparatuses for generating and maintaining security keys for a plurality of base stations connected to one terminal in a wireless communication system supporting a plurality of wireless link connections to one terminal.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Installing multiple small cells is being researched to increase the wireless network capability of a macro cell to respond to soring mobile data traffic.

Small cells with small cell coverage may recycle limited frequency resources and enables a high data rate of data transmission and transmit power savings since small cell base stations are positioned relatively close to users. The nature of the small cell base station having small cell coverage may cause frequent handover and radio link failure. A scheme attracting attention to address such issue is the dual connectivity that may allow a terminal to maintain a connection with the base station of the macro cell while simultaneously receiving data through a small cell link at a high data rate.

Presumably, small cell base stations may suffer from weak security as compared with macro cell base stations. Such assumption comes from the fact that, while macro cell base stations are directly managed by the communication network provider, small cell base stations scattered indoor (or in a home) are confronted with difficulty in physical management for security maintenance.

The dual connectivity may allow a macro cell base station to play a role as an anchor for controlling multiple small cell base stations. Thus, if the security information regarding the macro cell base station is exposed through the small cell base stations, personal information leaks, illegal billing, or other security issues are more likely to happen.

Further, assuming a few tens or a few hundreds of small cells to be installed to increase network cell capacity, control overhead and latency issues may arise due to procedures such as security key request and response ensuing when receiving the respective security keys of the small cells from a higher network (e.g., a mobility management entity (MME)).

Therefore, there is a need for a scheme and procedure for effectively generating and managing an independent security key by a layered network having a macro cell and multiple small cells.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for generating and maintaining a security key for a plurality of base stations connected to a single terminal in a wireless communication system. In particular, the instant disclosure provides a method and apparatus for generating and maintaining a security key in a wireless communication system under a dual connectivity environment, i.e., under the circumstance where a terminal is simultaneously linked to a macro cell base station and a small cell base station.

Another aspect of the present disclosure describes a scheme for applying and operating separate security keys for the respective packet data convergence protocol (PDCP) layers of a macro cell and a small cell, if the macro cell and the small cell have the PDCP layers, in a network where a terminal is simultaneously linked to the macro cell base station and the small cell base station that coexists in the coverage of the macro cell.

Another aspect of the present disclosure is to provide a method and apparatus for generating and managing an independent security key between a macro cell and a small cell layered network in a wireless communication system simultaneously supporting multiple transmission links.

Another aspect of the present disclosure provides an apparatus and method for generating, removing, or exchanging security keys when a base station is connected, released, or exchanged considering the network layer of a source base station and a target base station due to an issue that arises owing to a difference in security capacity between per-layer base stations in the layered network.

Another aspect of the present disclosure provides a process for generating a security key and transmitting security key-related information when a small cell is added to a macro cell base station and data radio bearer (DRB) starts to be transmitted, when a small cell is changed (e.g., another small cell is connected), or when a small cell is released so that the macro cell resumes serving a corresponding DRB.

Another aspect of the present disclosure provides an apparatus and method for independently maintaining the security keys of the macro cell and the small cells while selectively maintaining the independence of security keys between the small cells in order to address the control overhead and latency issues when independently generating security keys from a higher network (a mobility management entity (MME)).

Another aspect of the present disclosure provides an apparatus and method for addressing the control overhead and latency issues in such a way as to simultaneously generate multiple security keys when independently generating security keys from a higher network (a MME).

Another aspect of the present disclosure provides an apparatus and method for continuously maintaining a count value that is information to identify user data forwarded between base stations upon handover through a radio resource control (RRC) reconfiguration process and using the same PDCP configuration to prevent data loss when changing a connected base station (adding, releasing, or exchanging).

In accordance with another aspect of the present disclosure, a method for communicating by a user equipment with a macro cell base station and a small cell base station in a communication system is provided. The method includes applying a first base station security key to a first communication link with the macro cell base station; generating a second base station security key to be used for a second communication link with the small cell base station based on the first base station security key; applying the second base station security key to the second communication link with the small cell base station; and communicating through at least one of the first communication link and the second communication link.

In accordance with another aspect of the present disclosure, a method for communicating by a macro cell base station with a user equipment and a small cell base station in a communication system is provided. The method includes determining a first base station security key for a first communication link with the user equipment; generating a second base station security key to be used for a second communication link between the small cell base station and the user equipment based on the first base station security key; and transmitting the generated second base station security key to the small cell base station.

In accordance with another aspect of the present disclosure, a user equipment communicating with a macro cell base station and a small cell base station in a communication system is provided. The user equipment includes a controller configured to apply a first base station security key to a first communication link with the macro cell base station, generate a second base station security key to be used for a second communication link with the small cell base station based on the first base station security key, and apply the second base station security key to the second communication link with the small cell base station; and a transceiver configured to communicate through at least one of the first communication link and the second communication link.

In accordance with another aspect of the present disclosure, a macro cell base station communicating with a user equipment and a small cell base station in a communication system is provided. The macro cell base station includes a controller configured to determine a first base station security key for a first communication link with the user equipment, and generate a second base station security key to be used for a second communication link between the small cell base station and the user equipment based on the first base station security key; and a transceiver configured to transmit the generated second base station security key to the small cell base station.

In accordance with another aspect of the present disclosure, a method of performing communication by a user terminal forming a communication link for data transmission with a macro cell base station and a small cell base station located in a communication system is provided. The method includes applying a first base station security key to a communication link with the macro cell base station, generating a second base station security key to be used for a communication link with the small cell base station, applying the second base station security key to the communication link with the small cell base station, and communicating user data through the communication links to which the security keys are applied.

In accordance with another aspect of the present disclosure, a method for performing communication by a macro cell base station forming a communication link with a user terminal in a communication system is provided. The method includes a small cell base station and the user terminal, comprising: determining to add a small cell base station to form a communication link with the user terminal, sending a request for a next hop (NH) and a next hop chaining counter (NCC) to a MME, receiving a response including the NCC, generating a first base station security key to be used for a communication link between the added small cell base station and the user terminal using the NH included in the received response, and transmitting the generated first base station security key to the added base station.

In accordance with yet another aspect of the present disclosure, a user terminal forming a communication link for data transmission with a macro cell base station and a small cell base station located in a communication system is provided. The user terminal includes a controller configured to apply a first base station security key to a communication link with the macro cell base station, to generate a second base station security key to be used for a communication link with the small cell base station, and to apply the second base station security key to the communication link with the small cell base station, and a transceiver configured to communicate user data through the communication links to which the security keys are applied.

In accordance with still another aspect of the present disclosure, proposes a macro cell base station forming a communication link with a user terminal in a communication system including a small cell base station and the user terminal is provided. The macro cell base station includes a controller configured to determine to add a small cell base station to form a communication link with the user terminal, to send a request for a NH and a NCC to a MME, to receive a response including the NCC, and to generate a first base station security key to be used for a communication link between the added small cell base station and the user terminal using the received NH, and a transceiver configured to transmit the generated first base station security key to the added base station.

Another aspect of the present disclosure, the PDCP layer exists in each of the macro cell and the small cells and separate security keys apply and operate for them in a network where the small cells coexist within the coverage of the macro cell so that two or more links are simultaneously connected to the terminal. Thus, the security of the macro cell base station may be maintained even when using the small cell base stations with relatively weak security as compared with the macro cell base station.

Further, according to another aspect of the present disclosure, there is provided a method for generating security keys or transmitting information relating to the same under the circumstance where a small cell is added to the macro cell base station so that a DRB starts to be transmitted or the small cell is released so that the macro cell resumes serving the corresponding DRB. Thus, security keys for multiple small cells may be generated and control-related overhead issues may be addressed while maintaining the security of the macro cell base station for the small cell base stations. That is, an aspect of the present disclosure is to minimize security key control-related overhead while maintaining the security for an interface (X2) between the macro cell base station and a small cell base station with a relatively weak security as compared with the macro cell base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
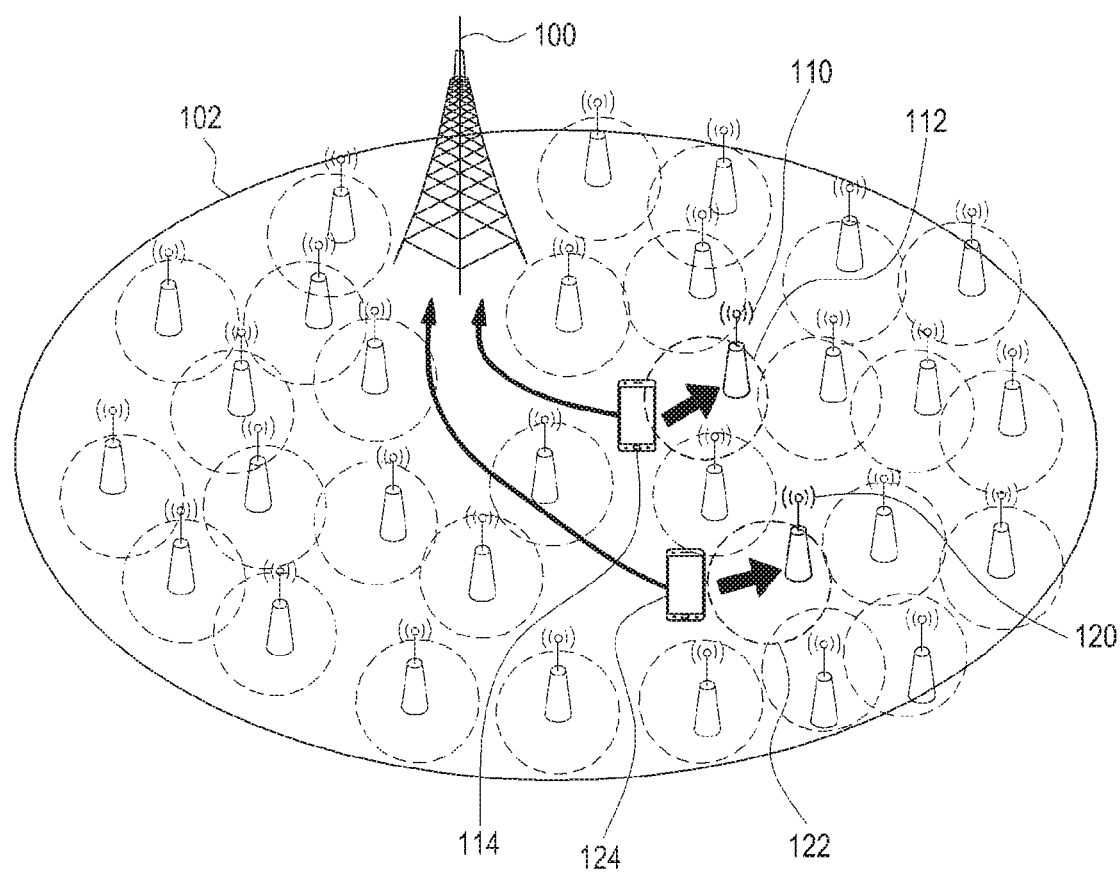
FIG. 1 is a view illustrating a case in which a terminal establishes dual connectivity for a macro cell and small cells that coexist in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Such denotations as "first," "second," "A," "B," "(a)," and "(b)," may be used in describing the components of the present disclosure. These denotations are provided merely to distinguish a component from another, and the essence of the components is not limited by the denotations in light of order or sequence. When a component is described as "connected," "coupled," or "linked" to another component, the component may be directly connected or linked to the other component, but it should also be appreciated that other components may be "connected," "coupled," or "linked" between the components.

Before detailing the present disclosure, examples of meanings or denotations applicable to some terms used in this disclosure are proposed. However, it should be noted that the present disclosure is not limited thereto.

The present disclosure targets wireless communication networks. Tasks performed over a wireless communication network may be done while a system (e.g., a base station) in charge of the wireless communication network controls the network and transmits data or may be done by a terminal coupled with the wireless network.

The wireless communication system includes at least one base station (BS). Each base station provides communication services within a particular geographical area (generally referred to as a cell). A cell may be divided into multiple areas (referred to as sectors).

A base station is an entity communicating with a terminal and may be denoted as, e.g., a BS, a base transceiver system (BTS), a NodeB (NB), an eNodeB (eNB), or an access point (AP).

A cell should be comprehensively interpreted to denote some area covered by a base station and collectively means a mega cell, a macro cell, a small cell, a micro cell, a pico cell, a femto cell, or other various coverage areas. It should be noted that according to the context of the present disclosure the term "macro cell" may mean a base station of the macro cell, and the term "small cell" may mean a base station of the small cell.

The macro cell base station may also be referred to as a macro cell eNB, macro eNB, or MeNB.

The small cell is a cell with a smaller cell area than the macro cell and may include a pico cell, a femto cell, or a micro cell. The small cell base station may also be denoted as a small cell eNB, small eNB, or SeNB.

A user equipment is a mobile or stationary entity communicating with a base station and may be denoted as UE, mobile station (MS), mobile equipment (ME), device, wireless device, handheld device, terminal, mobile terminal (MT), user terminal (UT), or subscriber station (SS).

Downlink means communication from a base station to a terminal, and uplink means communication between a terminal to a base station. For downlink, a transmitter may be part of a base station, and a receiver may be part of a terminal. For uplink, a transmitter may be part of a terminal, and a receiver may be part of a base station.

FIG. 1 is a view illustrating a case in which a terminal establishes dual connectivity for a macro cell 102 and small cells that coexist in a wireless communication system.

Discussion is underway for systems that offload soring mobile traffic data by adding small cell networks to a wireless communication system (e.g., a macro cell network). As an example, the coverage of a macro cell 102 that is served by a macro cell base station 100 is denoted in solid lines, and coverages 112 and 122 of small cells that are served by small cell base stations 110 and 120 are circled in dotted lines as shown in FIG. 1.

The small cells 112 and 122 including at least one pico cell, femto cell, or micro cell have smaller coverage but may have multiple small cell base stations installed therein, and thus, the small cells may play a role to offload soring mobile data. The small cells have a smaller transmission distance and good channel environment and they may thus provide services to users at a higher data rate and may easily recycle limited frequency resources (frequency bands) while saving power consumed by the terminal.

The small cells may be confronted with frequent handoff when supporting the mobility of terminals 114 and 124 due to their smaller coverage. To support such frequent handoff, the terminal needs to simultaneously connect to the macro cell base station. Further, one terminal may be served by multiple small cell base stations.

Hereinafter, dual connectivity refers to a network structure in which a terminal is served from two or more base stations connected thereto. The terminal may be served by a base station through a control channel or data channel and may be provided expanded services from multiple base stations without limited to those from two cells (the macro cell and the small cell).

Figure 2:
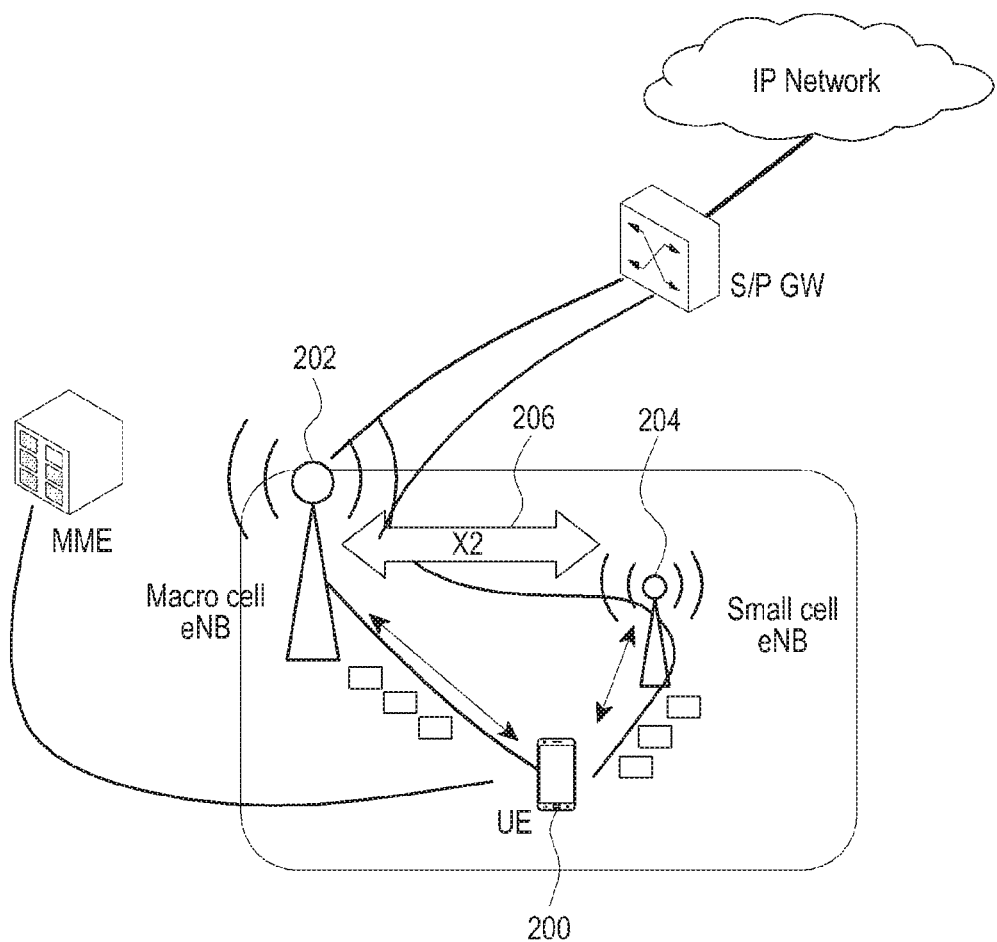
FIG. 2 is a view illustrating a network control plane and user plane under a dual connectivity situation where a macro cell and a small cell are simultaneously connected to a terminal in a wireless communication system according to an embodiment of the present disclosure.

FIG. 2 is a view illustrating a network control plane and user plane under a dual connectivity situation where a macro cell and a small cell are simultaneously connected to a terminal in a wireless communication system.

Referring to FIG. 2, under the dual connectivity situation where a terminal is simultaneously connected to a macro cell and a small cell, the user terminal 200 is linked to the macro cell base station (macro cell eNB (MeNB)) 202 and the small cell base station (small cell eNB (SeNB)) 204 through the connection of a network control lane or user plane. The macro cell base station 202 and the small cell base station 204 may be connected through, e.g., an X2 interface 206.

Under the dual connectivity situation where the small cell is added to the existing macro cell (e.g., the cellular network), the terminal is not controlled by the macro cell alone. That is, under the dual connectivity situation, the terminal may also be controlled (e.g., resource allocation) by one or more small cell base stations.

A protocol stack structure in which the small cell base stations, as well as the macro cell base station, also has an independent PDCP to support dual connectivity according to an embodiment of the present disclosure is described with reference to FIGS. 3 to 5.

Figure 3:
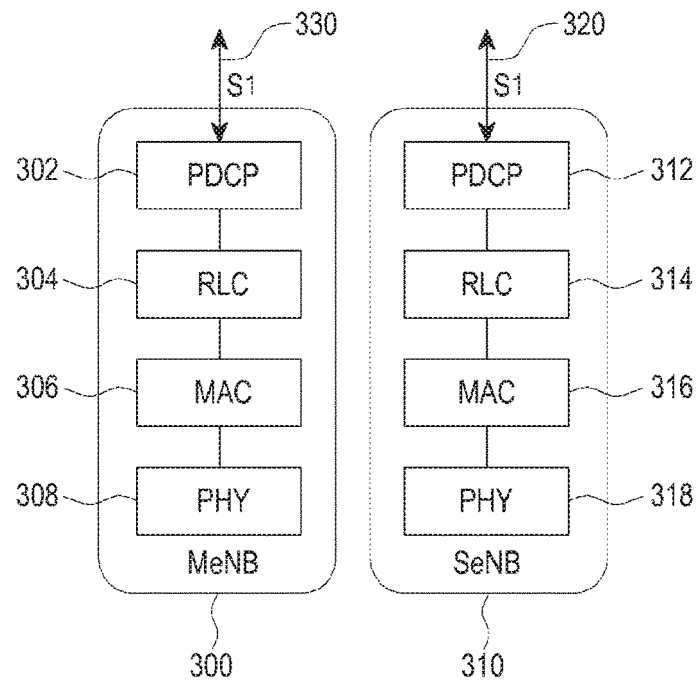
FIG. 3 is a view illustrating an example of a protocol stack structure to support dual connectivity according to an embodiment of the present disclosure.

FIG. 3 is a view illustrating an example of a protocol stack structure for supporting dual connectivity according to an embodiment of the present disclosure.

The macro cell base station 300 and the small cell base station 310, respectively and independently, include packet data convergence protocol (PDCP) layers 302 and 312, radio link control (RLC) layers 304 and 314, medium access control (MAC) layers 306 and 316, and physical (PHY) layers 308 and 318.

Referring to, FIG. 3 exemplifies the structure in which the user plane of the small cell base station 310 is directly connected to a core network (CN) via a separate S1 interface 320 distinguished from the user plane S1 interface 330 of the macro cell base station 300.

The small cell base station 310 is directly connected to the core network (CN) via the S1 interface 320, and the small cell base station 310 may transmit user plane data via a separate path, not through the macro cell base station or inter-base station connection (e.g., the X2 interface).

Figure 4:
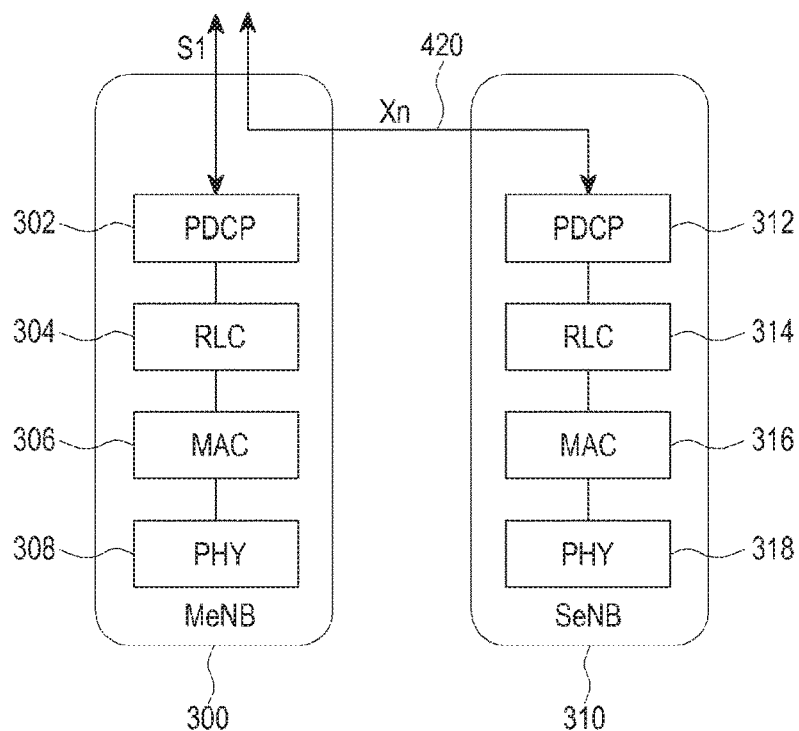
FIG. 4 is a view illustrating another example of a protocol stack structure to support dual connectivity according to an embodiment of the present disclosure.

FIG. 4 is a view illustrating another example of a protocol stack structure for supporting dual connectivity according to an embodiment of the present disclosure.

Referring to FIG. 4, the macro cell base station 300 and the small cell base station 310, respectively and independently, include PDCP layers 302 and 312, RLC layers 304 and 314, MAC layers 306 and 316, and PHY layers 308 and 318.

In particular, FIG. 4 exemplifies the structure in which the user plane of the small cell base station 310 is connected to the core network (CN) via the macro cell base station 300 through the Xn interface (e.g., the X2 interface) 420.

In such case, since the data of all the user planes is transmitted via the macro cell base station through the inter-base station connection (X2 ), the transmission capacity may be limited by the latency and restricted capacity of the backhaul. That is, the connection structure shown in FIG. 4 is a structure in which one DRB for small cells is served through one base station (any one of the macro cell base station or small cell base stations) without occurrence of DRB split for small cells.

Figure 5:
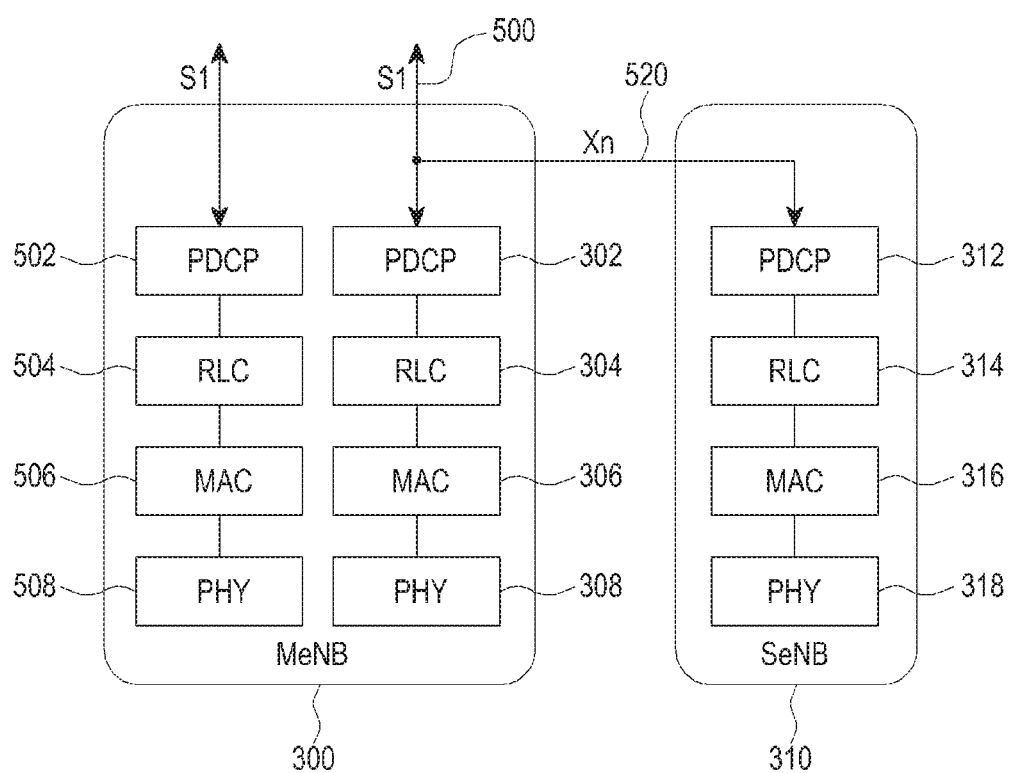
FIG. 5 is a view illustrating another example of a protocol stack structure to support dual connectivity according to an embodiment of the present disclosure.

FIG. 5 is a view illustrating another example of a protocol stack structure for supporting dual connectivity according to an embodiment of the present disclosure.

Referring to FIG. 5, the macro cell base station 300 and the small cell base station 310 respectively and independently include PDCP layers 502 and 302 and a PDCP layer 312, RLC layers 504 and 304 and an RLC layer 314, MAC layers 506 and 306 and an MAC layer 316, and PHY layers 508 and 308 and a PHY layer 318, and the user plane of the small cell base station 310 is connected to the small cell base station via the macro cell base station from the CN.

In such case, since the data of all the user planes is transmitted via the macro cell base station through the inter-base station connection (the Xn interface 520), the transmission capacity may be limited by the latency and restricted capacity of the backhaul. The connection structure shown in FIG. 5 is a structure in which a DRB split for small cells occurs (a split from the S1 interface 500 to the Xn interface 520), and one DRB is served through multiple base stations (the macro cell base station and small cell base stations).

Now described is a scheme for generating, managing, and operating a security key when a macro cell and a small cell respectively include independent PDCP layers as described above in connection with FIGS. 3 to 5.

Figure 6:
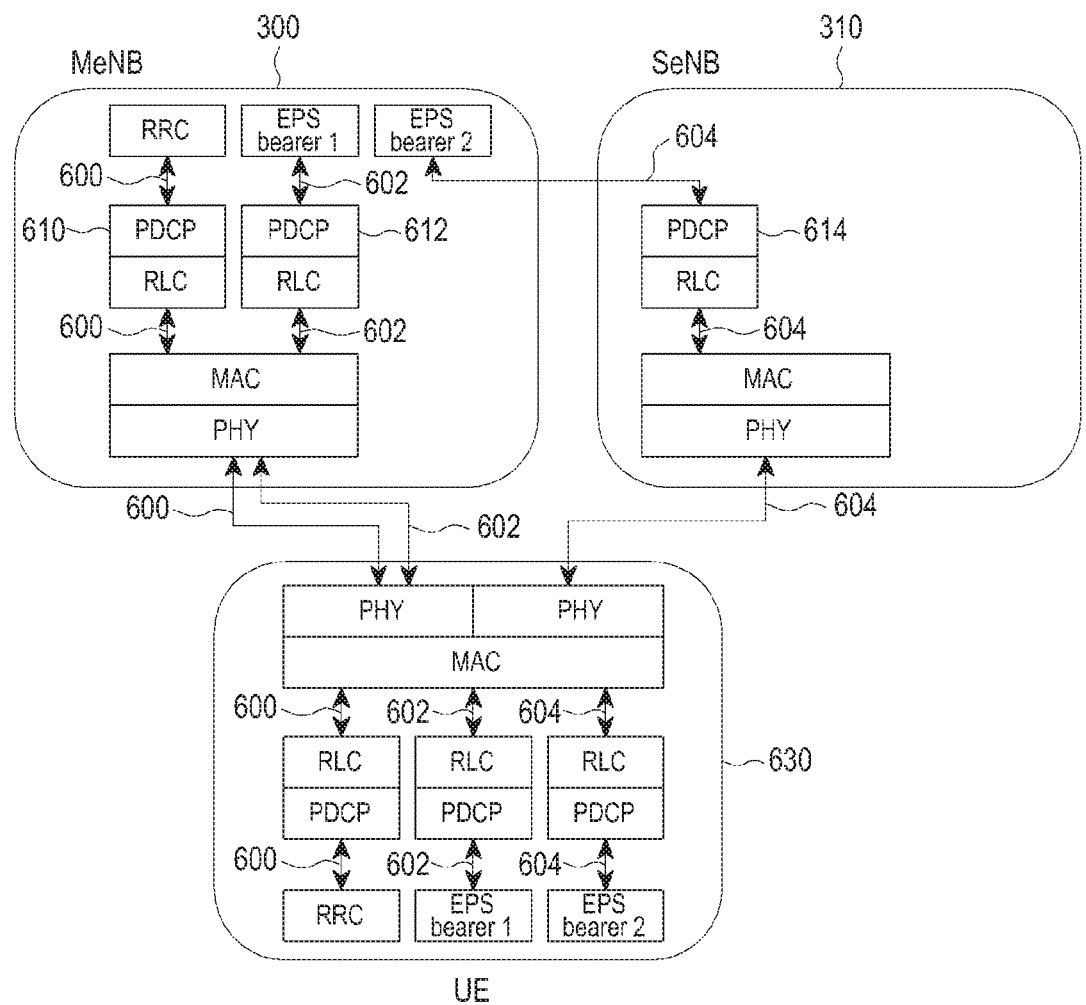
FIG. 6 is a view illustrating an example of communication between a macro cell base station, a small cell base station, and a user terminal in a protocol stack structure where a macro cell and a small cell have an independent packet data convergence protocol. (PDCP) layer according to an embodiment of the present disclosure.

FIG. 6 is a view illustrating an example of communication between a macro cell base station, a small cell base station, and a user terminal in a protocol layer structure where a macro cell and a small cell have an independent PDCP layer according to an embodiment of the present disclosure.

Data of the control plane is transferred through the macro cell base station 300 (a link 600) in the embodiment of FIG. 6. Further, data of the user plane is served to the user terminal 630 through two DRBs, i.e., one through the macro cell base station 300 (particularly between EPS bearer 1 and the PDCP 612 of the link 602) and the other through the small cell base station 310 (particularly between EPS bearer 2 and the PDCP 614 of the link 604).

The user terminal 630 forms links 600 and 602 with the macro cell base station 300 and a link 604 with the small cell base station 310 and communicate data via separate protocol layers (PHY, MAC, RLC, and PDCP layers).

The PDCP layers 610, 612, and 614 independently present in the macro cell and the small cell are in charge of security. In this case, required is a design as to whether the same or separate and independent security keys are used for the link 602 through the macro cell in the PDCP layer 612 of the macro cell and the link 604 through the small cell in the PDCP layer 614 of the small cell.

Figure 7:
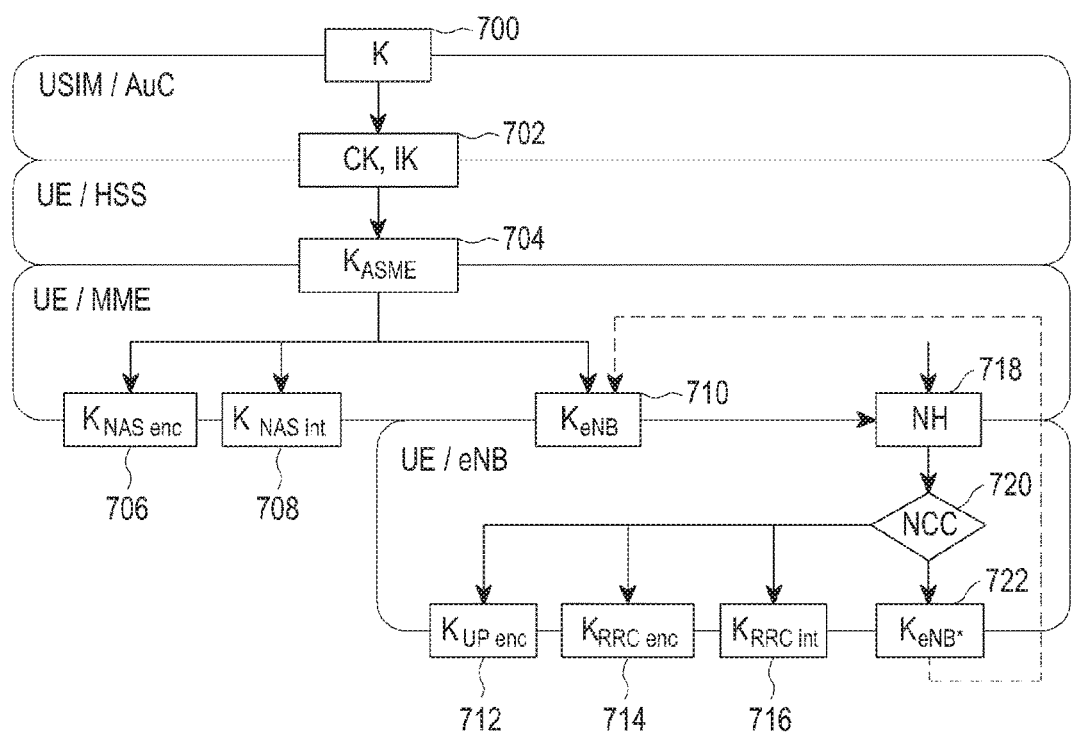
FIG. 7 is a view illustrating a structure of a security key used in a 3rd Generation Partnership Project (3GPP) long term evolution (LTE) system according to an embodiment of the present disclosure.

FIG. 7 is a view illustrating a structure of a security key used in a 3GPP LTE system according to an embodiment of the present disclosure.

A lower level key may be generated from a higher level key.

The top level key K (700) used to authenticate the user terminal is present in the universal subscriber identity module (USIM) or authentication center (AuC).

The lower level keys CK, IK (702) that may be generated from the higher level key K (700) may be known only to the UE or the home subscriber server (HSS). That is, the lower level keys CK, IK (702) is present in the UE or the HSS.

The MME may generate $K_{ASME}$ (704), which is a key of the access security management entity (ASME), based on the lower level key CK, IK (702). The ASME is an entity receiving the top level key of the access network from the HSS, and for the evolved universal mobile telecommunications system terrestrial radio access network (E-UTRAN), the MME may correspond to the ASME.

The UE or the base station may generate an integrity key $K_{NASint}$ (708) and an encryption key $K_{NASenc}$ (706) for the non access stratum (NAS) based on $K_{ASME}$ (704). Further, the UE or base station may generate $K_{eNB}$ 710 which is a base key for the security key of each base station.

The UE or the base station may generate $K_{RRCint}$ (716), $K_{RRCenc}$ (714), and $K_{UPenc}$ which are security keys for the access stratum (AS) based on $K_{eNB}$ (710).

Subsequently, generation and transfer of a security key are described, focusing on the authentication process.

UE-MME LTE mutual authentication is carried out via an evolved packet system authentication and key agreement (EPS AKA) procedure performed between the UE, the MME, and the HSS as mutual authentication between the UE and the network. In the EPS AKA procedure, the HSS transmits an authentication vector (AV) to the MME, and the MME and the UE may perform mutual authentication using the authentication vector. As a result of the authentication, the UE and the MME share $K_{ASME}$ (704) and obtain, from $K_{ASME}$ (704), $K_{NASint}$ (708) and $K_{NASenc}$ (706), which are security keys of the NAS, and $K_{eNB}$ (710), which is the base key of the base station.

It is $K_{ASME}$ (704) that the MME receives from the HSS. Since $K_{ASME}$ (704) cannot be transferred to the UE via the E-UTRAN, $K_{ASME}$ (704) may be identified by $KSI_{ASME}$ that corresponds to $K_{ASME}$ (704) in a one-to-one manner and replaces $K_{ASME}$ (704).

An integrity check and encryption may be performed on the NAS signaling message that is the control plane protocol between the UE and the MME. The integrity check is a mandatory function, and encryption is an optional function. The base key for NAS security is $K_{ASME}$ (704) that is positioned in the UE and the MIME and is obtained through authentication between the subscriber and the network. NAS security keys are obtained from $K_{ASME}$ (704) in the UE and the MME and come in such types as integrity keys $K_{NASint}$ (708) and encryption keys $K_{NASenc}$ (706).

The control plane between the UE and the eNB performs an integrity check (mandatory) and encryption (optional) on RRC signaling, and the user plane performs encryption (optional) on IP packets. For access stratum (AS) security, the base key is $K_{eNB}$ (710), and $K_{eNB}$ (710) is positioned in the UE and the eNB and is obtained from $K_{ASME}$ (704). The eNB does not include $K_{ASME}$ (704). Thus, the MME generates $K_{eNB}$ (710) from $K_{ASME}$ (704) and transfers to the eNB.

AS security keys are obtained from $K_{eNB}$ (710) in the UE and the eNB and come in such types as $K_{RRCint}$ (716), $K_{RRCenc}$ (714), and $K_{UPenc}$ (712). $K_{RRCint}$ (716) and $K_{RRCenc}$ (714), respectively, are used for integrity check and encryption on RRC signaling, and $K_{UPenc}$ (712) is used for encryption on user plane data (IP packets).

The base station (macro cell base station or small cell base station) may receive a next hop (NH) 718 and a next hope chaining counter (NCC) 720 from the MME. When the NCC 720 is transferred to the terminal, the terminal may determine the NH 718 using the NCC 720. The terminal or the base station may generate KeNB* (722) that is a security key of the base station using the NH 718 and may apply the generated security key as the security key of the base station. KeNB* (722) may be generated based on the NH 718 or may be generated based on a previous security key 710 of the base station.

Figure 8A:
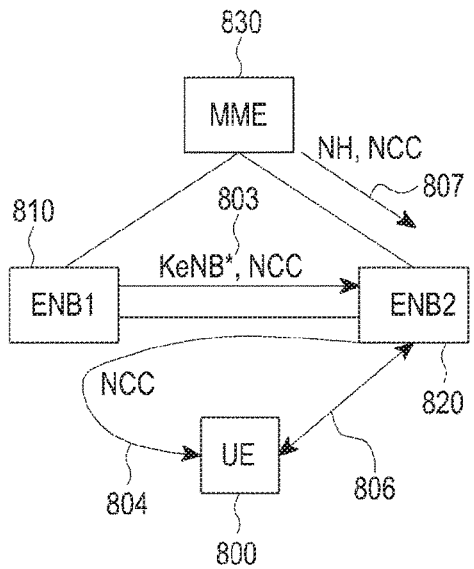
FIG. 8A is a view illustrating an example of generating a security key and transmitting related information when handover occurs between base stations in a communication system according to an embodiment of the present disclosure.

FIG. 8A is a view illustrating an example of generating a security key and transmitting related information when handover occurs between base stations in a communication system according to an embodiment of the present disclosure.

Figure 8B:
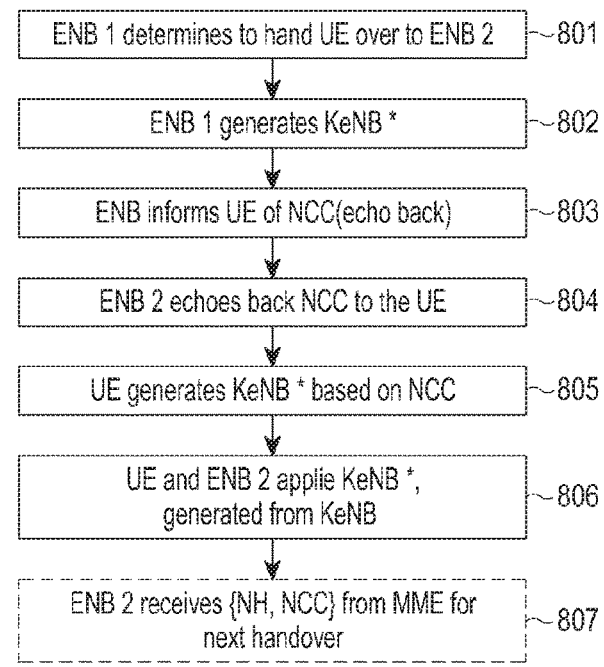
FIG. 8B is a flowchart illustrating an example of generating a security key and transmitting related information when handover occurs between base stations in a communication system according to an embodiment of the present disclosure.

FIG. 8B is a flowchart illustrating an example of generating a security key and transmitting related information when handover occurs between base stations in a communication system according to an embodiment of the present disclosure.

If the user terminal 800 reports a result of channel measurement (measurement report) to the serving base station 810, the serving base station 810 or the MIME 830 determines to hand the user terminal 800 over to the target base station 820 based on the channel measurement result at operation 801.

The serving base station 810 generates a base station security key, KeNB*, to be used in the new base station (target base station) 820 at operation 802. That is, the procedure of generating (or regenerating) the base station security key KeNB* to be used in the target base station 820 may be initiated by the serving base station 810 or the MME 830.

The serving base station 810 forwards KeNB* and the NCC to the target base station 820 at operation 803.

The target base station 820 informs the user terminal 800 of the NCC (804), and the user terminal 800 generates KeNB* based on the NCC at operation 805.

The user terminal 800 and the target base station 820 perform data transmission by applying the new base station security key KeNB* at operation 806.

Selectively, the target base station 820 may also receive a new NH-NCC pair (i.e., {NH, NCC}) from the MIME 830 in preparation for next handover at operation 807.

Meanwhile, the communication network including a small cell may be installed so that the coverage of the small cell overlaps the coverage of the macro cell within the macro cell coverage, and the user terminal may establish a link with each of the macro cell base station and the small cell base station at the same time (i.e., two or more links). Although handover occurs between equivalent base stations in the 3GPP LTE system, the small cell network according to an embodiment of the present disclosure overlaps the macro cell, and thus, the small cell link may be added to the link that is served only by the macro cell, the small cell link may be released, or the small cell link may be replaced with a link with a new small cell base station (by handover between the small cells).

If the same security key as the one used in the macro cell is used for small cells subjected to RRC control by the macro cell, the complexity of generation of security keys may be reduced (because there is no computation for generating security keys for small cells), but if the security keys of the small cells that are relatively security vulnerable leak, the security key of the macro cell would be highly likely to leak as well. By contrast, if the macro cell and the small cell use separate independent security keys, they may have robust security but may cause complicated control and overhead in generating and managing security keys. Receiving security keys from a higher network (e.g., the MME) every handover or when installing a few tens or a few hundreds of small cells to increase network cell capacity would cause control overhead and latency issues.

Accordingly, the present disclosure proposes a scheme for independently generating and managing each security key or sharing and managing a single security key according to a predetermined standard or condition in a network where a macro cell and small cells coexist.

Further, the present disclosure proposes a scheme for generating, transmitting, and managing a security key for a transmission link based on a security key corresponding to another transmission link and a scheme in which each base station directly generates and manages a security key.

In other words, there are proposed a scheme for generating and managing a security key considering layers between a macro cell and a small cell in generating and managing a security key per network layer, a scheme for generating, sharing, and using the same security key between the network layers of the macro cell link and the small cell link, a scheme for generating and managing separate security keys between the network layers of the macro cell link and the small cell link, a scheme for generating a security key for the small cell link based on a security key of the macro cell link, transmitting the security key for the small cell link to the small cell base station, and managing the same, and a scheme for generating a security key for the small cell link independently from a security key of the macro cell link, transmitting the security key to the small cell base station, and managing the same.

Figure 9A:
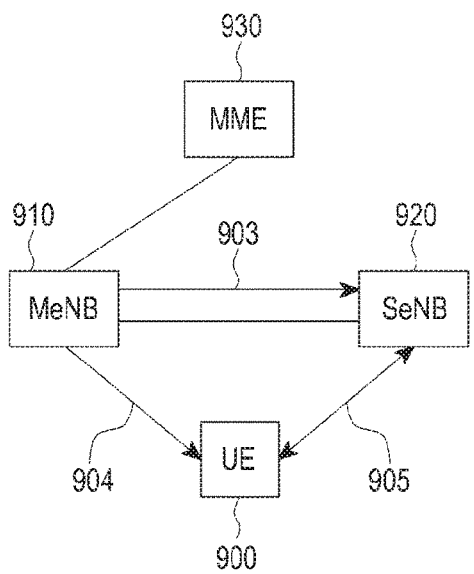
FIG. 9A is a view illustrating an example of generating a security key and transmitting related information for maintaining a separate security key when a small cell is added according to an embodiment of the present disclosure.

FIG. 9A is a view illustrating an example of generating a security key and transmitting related information for maintaining a separate security key when a small cell is added according to an embodiment of the present disclosure.

Figure 9B:
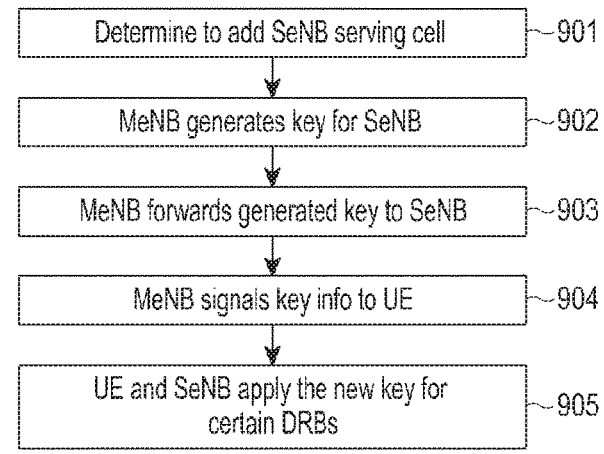
FIG. 9B is a flowchart illustrating an example of generating a security key and transmitting related information for maintaining a separate security key when a small cell is added according to an embodiment of the present disclosure.

FIG. 9B is a flowchart illustrating an example of generating a security key and transmitting related information for maintaining a separate security key when a small cell is added according to an embodiment of the present disclosure.

If the user terminal 900 reports a result of channel measurement (measurement report) to the macro cell base station 910, the macro cell base station 910 determines whether to add the small cell base station 920 to the user terminal 900 based on the channel measurement result at operation 901.

The macro cell base station 910 or the small cell base station 920 may generate a security key, KeNB*, of the small cell base station 920 (902). That is, the procedure of generating (or regenerating) the base station security key KeNB* to be used in the small cell base station 920 may be initiated by the macro cell base station 910 or the small cell base station 920. Selectively, the procedure of generating (or regenerating) the base station security key KeNB* to be used in the small cell base station 920 may also be initiated by the procedure of varying (or regenerating) the base station security key used in the macro cell base station 910 (the variation or regeneration of the macro cell base station security key may be initiated in the MIME or the macro cell).

The security key of the small cell base station 920 may be used by the user terminal 900 for a new link for connection with the small cell base station 920. Selectively, the macro cell base station 910 may inquire and obtain information to generate a base station security key to be used for the new link from the MME 930.

The macro cell base station 910 forwards the generated KeNB* and NCC to the added small cell base station 920 at operation 903.

The macro cell base station 910 informs the user terminal 900 of security key-related information (e.g., the NCC) at operation 904, and the user terminal 900 generates a base station security key KeNB* to be used for the link with the small cell base station based on the security key-related information.

Thereafter, the user terminal 900 and the added small cell base station 920 may perform any DRB transmission by applying the security key KeNB* that they generated on their own or received at operation 905.

Embodiments of sharing security key information considering the relationship between base stations forming links with a user terminal are now described.

According to an embodiment of the present disclosure, the security key of the macro cell base station may be shared by the small cell base station.

In such case, the small cell base station may generate and use the security key of the small cell base station using (based on) the shared (transferred) security key of the macro cell base station.

Further, the small cell base station may transmit the security key of the macro cell base station or the generated security key of the small cell base station to another small cell base station so that the other small cell base station by itself may generate and use its security key.

Meanwhile, the security key of the other small cell base station may also be generated by the macro cell base station.

That is, the security key of the small cell base station may be transferred (shared) to the macro cell base station, and the macro cell base station receiving the security key of the small cell base station may generate the security key of the other small cell base station using (based on) the security key of the small cell base station and transfer to the other base station so that the other small cell base station may use the same.

According to another embodiment of the present disclosure, the security key of the macro cell base station might not be shared by the small cell base station.

In this case, the small cell base station receives and uses the security key (not the security key of the macro cell base station) of the small cell base station that is generated and transferred by the macro cell base station.

The security key of the small cell base station may be shared or not by the macro cell base station.

In case the security key of the small cell base station is shared by the macro cell base station, the macro cell base station generates the security key of the other small cell base station using (based on) the shared security key of the small cell base station and transmits the generated security key of the other small cell base station so that the other small cell may use it.

Unless the security key of the small cell base station is shared by the macro cell base station, the small cell base station generates the security key of the other small cell base station and transmits the security key to the other small cell base station, or the macro cell base station generates a security key independent from the security key of the small cell base station and transmits the independent security key to the other small cell base station so that the other small cell base station may use it.

Figure 10:
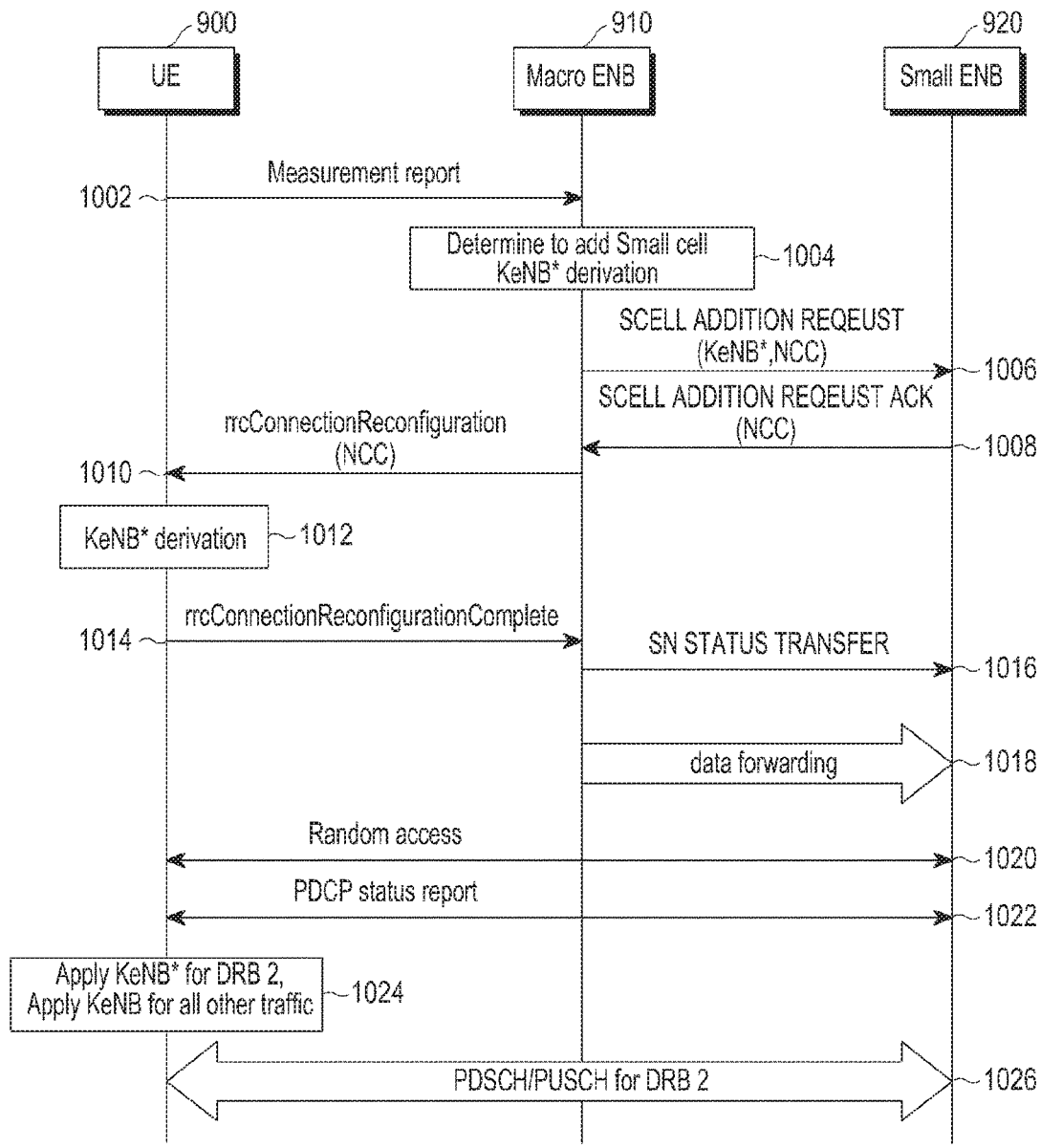
FIG. 10 is a view illustrating a process of generating and transmitting a security key and an initial setup process of a small cell link when a macro cell determines to add a small cell on the control plane according to an embodiment of the present disclosure.

FIG. 10 is a view illustrating the process of generating and transmitting a security key and an initial setup process of a small cell link when a macro cell determines to add a small cell on the control plane according to an embodiment of the present disclosure.

If the user terminal 900 reports a result of channel measurement (measurement report) to the macro cell base station 910 (1002), the macro cell base station 910 determines whether to additionally link the small cell base station to the user terminal 900 based on the channel measurement result and generates a base station security key KeNB* to be used for the new link to be connected to the small cell base station 920 (1004).

The macro cell base station 910 includes KeNB* and/or NCC in a small cell add request message (SCELL ADDITION REQUEST) and forwards the same to the small cell base station 920 (1006).

The added small cell base station 920 responds by transferring a small cell add acknowledgement message (SCELL ADDITION ACK) to the macro cell base station 910 (1008). Selectively, the small cell add acknowledgement message may contain an NCC value.

The macro cell base station 910 transfers a message for RRC reconfiguration (rrcConnectionReconfiguration) to the user terminal 900 (1010). Selectively, the message for RRC reconfiguration may contain the NCC value transferred from the small cell base station 920.

Having received security key-related information (e.g., the NCC) through the RRC reconfiguration message 1010, the user terminal 900 may generate a base station security key KeNB* for a new link to be connected with the small cell base station 920 (1012).

The macro cell base station 910 receives a message (rrcConnectionReconfigurationComplete) responding to the RRC reconfiguration message from the user terminal 900 (1014).

The macro cell base station 910 transmits the RRC reconfiguration message rather than sending out an RRC release message or RRC reset message to the user terminal 900 in order to prevent data transferred to the user terminal 900 from being lost while forwarded from the macro cell base station 910 to the small cell base station 920. That is, use of the RRC release message or RRC reset message may cause the COUNT value forwarded to identify the user data to be initialized, thus leading to data loss. Accordingly, upon RRC configuration, an RRC reconfiguration process is performed to maintain the COUNT value. The COUNT value is a value recorded in the PDCP layer and is an index to identify data transferred to the user terminal. For example, the COUNT value may be a value ranging from 0 to 500 and may be used for retransmission of data that may be lost upon data forwarding.

Selectively, the macro cell base station 910 may perform a process 1016 of transferring the COUNT value through, e.g., a sequence number status transfer (SN STATUS TRANSFER) message from the previous transmission link (i.e., the macro cell base station) to the target transmission link (i.e., the small cell base station) before forwarding the data to the small cell base station 920.

Subsequently, the macro cell base station 910 may forward user data to be transferred to the user terminal 900 to the small cell base station 920 (1018). Selectively, the small cell base station 920 may perform management to detect or prevent data loss during the process 1018 of forwarding data from the macro cell base station 910 to the small cell base station 920 by using the COUNT value included in the sequence number status transfer (SN STATUS TRANSFER) message 1016.

Then, the user terminal 900 may perform transmission of a DRB with the small cell base station 920 based on the newly generated security key KeNB*. Selectively, the process of transmitting the DRB may include one or more of random access of the user terminal 900 to the small cell base station 920 (1020), PDCP status reporting (1022), applying the newly generated security key KeNB* to the newly generated data radio bearer (denoted "DRB 2") (1024), and transmitting a physical downlink shared channel (PDSCH) and/or physical uplink shared channel (PUSCH) for the DRB 2 (1026).

Figure 11:
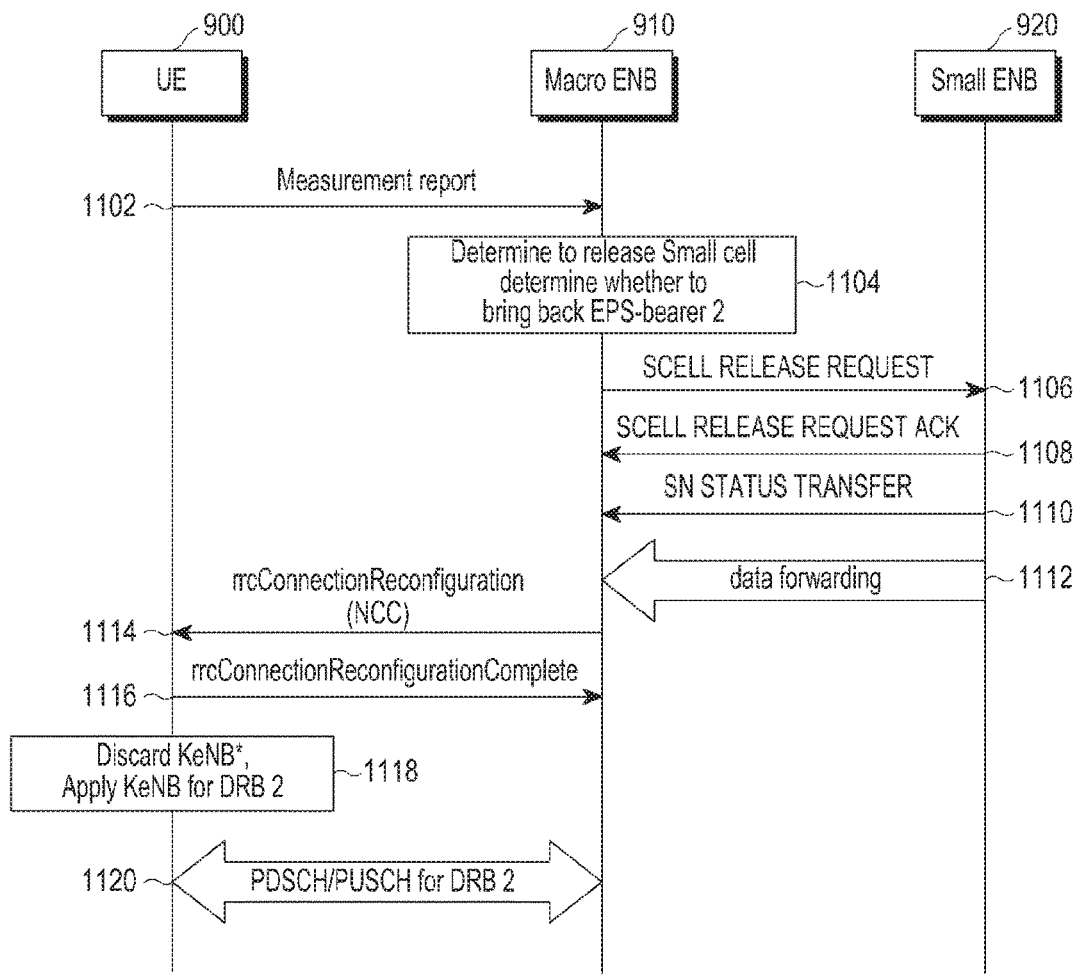
FIG. 11 is a view illustrating an process of discarding a security key and an process in which a terminal resumes communication with a macro cell base station when the macro cell determines to release a small cell on the control plane according to an embodiment of the present disclosure.

FIG. 11 is a view illustrating a process of discarding a security key and a process in which a terminal resumes communication with a macro cell base station when the macro cell determines to release a small cell on the control plane according to an embodiment of the present disclosure.

If the user terminal 900 reports the channel measurement result (measurement report) to the macro cell base station (macro ENB) 910 (1102), the macro cell base station 910 determines whether to release the link to the small cell base station 920 connected with the user terminal 900 (i.e., the small cell link) based on the channel measurement result and determines whether to apply the data radio bearer DRB2 used to be connected to the small cell base station 920 back to itself (i.e., the macro cell base station 910) (1104).

The macro cell base station 910 transmits a small cell release request (SCELL RELEASE REQUEST) message to the small cell base station 920 (1106), and the small cell base station 920 responds by transmitting a small cell release acknowledgment (SCELL RELEASE ACK) message to the macro cell base station 910 (1108).

Selectively, the small cell base station 920 may perform a process 1110 of transferring a COUNT value to identify user data to the macro cell base station 910 through a sequence number status transfer (SN STATUS TRANSFER) message before forwarding data to the macro cell base station 910 as the small cell link is released.

Subsequently, the small cell base station 920 may forward user data to be transferred to the user terminal 900 to the macro cell base station 910 (1112). Selectively, the macro cell base station 920 may perform management to detect or prevent data loss during the process 1112 of forwarding data from the small cell base station 920 to the macro cell base station 910 by using the COUNT value included in the sequence number status transfer (SN STATUS TRANSFER) message 1110.

The macro cell base station 910 transmits, to the user terminal 900, a message (rrcConnectionReconfiguration) for RRC reconfiguration (1114) and receives an RRC reconfiguration complete message (rrcConnectionReconfigurationComplete) from the user terminal 900 (1116). Selectively, the RRC reconfiguration message 1114 may contain an NCC value.

The macro cell base station 910 transmits the RRC reconfiguration message rather than an RRC release message or RRC reset message to the user terminal 900 for RRC configuration in order to continuously maintain the COUNT value.

The user terminal 900 may discard the security key KeNB* generated for the small cell link and applies the security key KeNB of the macro cell base station to DRB 2 (1118) and may perform DRB 2 PDSCH and/or PUSCH transmission (1120).

The macro cell base station or the small cell base station may previously receive multiple security key-related information items from a higher network entity (e.g., the MME) upon generating independent security keys and may use the information items to generate security keys.

At this time, the macro cell base station may access the MME and receive multiple security key-related information items (seed) to generate a security key and may transmit the security key to the small cell link. Further, a representative small cell base station may directly access the ME to receive multiple security key-related information items (seed) and forward them to a neighboring small cell base station, or each small cell base station may directly access the MIME to receive security key-related information (e.g., seed) to generate an independent security key.

A base station should receive an NH from the MIME in order to generate a new next hope (NH)-based security key that is not based on the security key KeNB of the macro cell base station. A process for the same is described with reference to FIGS. 12 and 13.

Figure 12:
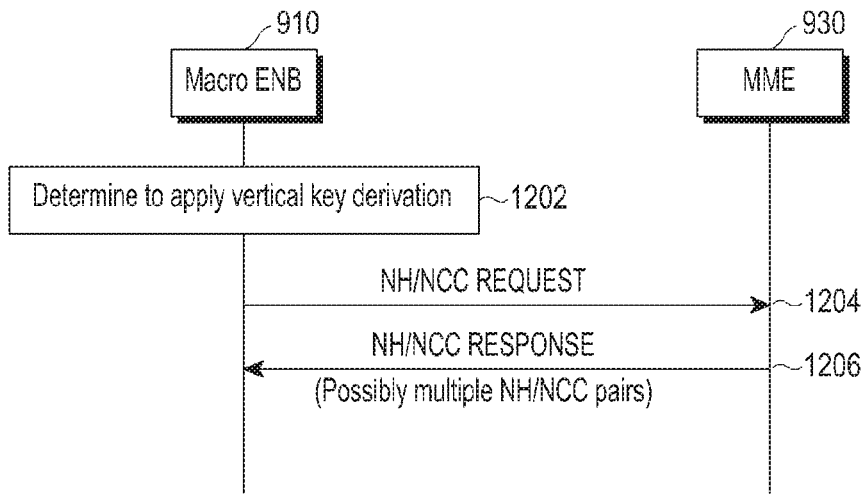
FIG. 12 is a view illustrating an procedure in which a base station obtains information for generating a security key from an MME according to an embodiment of the present disclosure.

FIG. 12 is a view illustrating a procedure in which a base station obtains information for generating a security key from an MME according to an embodiment of the present disclosure.

Referring to FIG. 12, an NH/NCC request (NH/NCC REQUEST) message is used as a new message to receive the NH/NCC from the MME.

If the macro cell base station 910 determines to generate a security key which requires a new NH-NCC pair (i.e., generating a vertical key) (1202), the macro cell base station 910 transmits an NH/NCC request (NH/NCC REQUEST) message to the MME 930 (1204). The MME 930 responds by sending out an NH/NCC response (NH/NCC RESPONSE) message to the macro cell base station 910 (1206).

Here, the NH/NCC response message 1206 may contain the NH-NCC pair. Selectively, the NH/NCC response message 1206 may include a plurality of NH-NCC pairs {NH, NCC}. Since the small cell base station has small cell coverage, handover or adding, release, or change of small cells may be frequent, and thus, more NH-NCC pairs {NH, NCC} are required for generating security keys for base stations.

Although the macro cell base station is an entity to send out the NH/NCC request message 1204 to request {NH, NCC}, for example, the small cell base station may, in some cases, send out the message to obtain {NH, NCC} from the MME.

Figure 13:
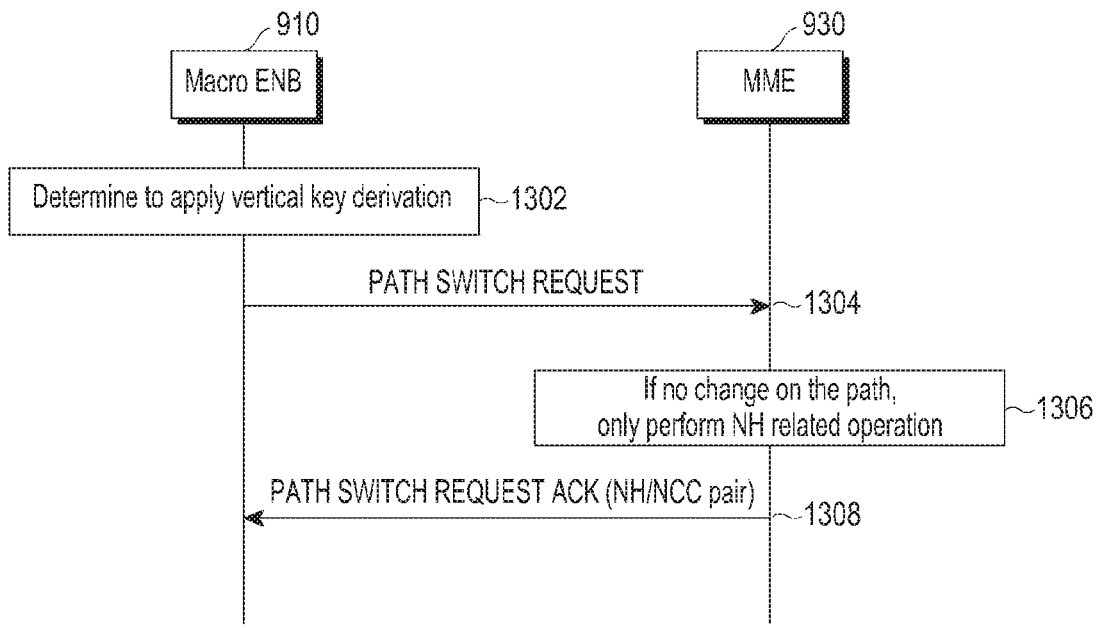
FIG. 13 is a view illustrating another procedure in which a base station obtains information for generating a security key from an MME according to an embodiment of the present disclosure.

FIG. 13 is a view illustrating another procedure in which a base station obtains information for generating a security key from an MME according to an embodiment of the present disclosure.

A path switch request (PATH SWITCH REQUEST) message is a message transmitted from a base station to the MME to change or switch data transmission paths (PATH) when handover occurs between base stations. In the embodiment shown in FIG. 13, the path switch request (PATH SWITCH REQUEST) message is used to receive the NH/NCC from the MME.

If the macro cell base station 910 determines to generate a security key which requires a new NH-NCC pair (i.e., generating a vertical key) (1302), the macro cell base station 910 transmits the path switch request (PATH SWITCH REQUEST) message to the MME 930 (1304).

In case a small cell base station is added, released, or changed, the data transmission path to the small cell base station may be varied or not depending on the structure of the user plane.

As an example, since the data transmission path interface 320 of the small cell becomes different from the data transmission path interface 330 of the macro cell in the case shown in FIG. 3, a path switch occurs.

As another example, in the case shown in FIGS. 4 and 5, although a small cell is added, the data transmission path is not changed (the same path passing through the macro cell as the one before the small cell is added). In such case, the path switch request message may contain, e.g., the same transmission layer address as the present one and E-radio access bearer (E-RAB) information.

Unless the path switch request (PATH SWITCH REQUEST) message received from the macro cell base station 910 indicates a path switch or change (e.g., the case shown in FIGS. 4 and 5), the MIME 930 performs only operations regarding the NH and NCC without a path switch, while in case the path switch request (PATH SWITCH REQUEST) message indicates a path switch, the MIME 930 performs operations regarding the NH and NCC and a data path switching operation (1306). That is, the MIME 930 transmits a path switch request acknowledgment (PATH SWITCH REQUEST ACK) message containing the NH-NCC pair to the macro cell base station 910 in response to the path switch request message (1308).

Selectively, the path switch request acknowledgment (PATH SWITCH REQUEST ACK) message 1308 may include a plurality of NH-NCC pairs {NH, NCC}. Since the small cell base station has small cell coverage, handover or adding, release, or change of small cells may be frequent, and thus, more NH-NCC pairs {NH, NCC} are required for generating security keys for base stations.

Although the macro cell base station is an entity to send out the path switch request (PATH SWITCH REQUEST) message 1304 to request {NH, NCC}, for example, the small cell base station may, in some cases, send out the message to obtain {NH, NCC} from the MME.

Described is an embodiment of independently generating and managing a security key when a user terminal adds a link with a small cell base station.

According to an embodiment of the present disclosure, there is proposed a scheme for selectively maintaining the independence of security keys between small cell base stations while managing a security key of a macro cell and security keys of small cells to be independently generated. That is, the security keys between the small cells may be determined to be generated independently from each other in some cases or to be dependent, the same or similar to each other in other cases.

Specifically, a small cell first added to the macro cell coverage may be rendered to generate a security key independent from the security key of the macro cell base station. A small cell added next to the first small cell may generate a dependent security key based on the security key of the first small cell.

Further, under a certain condition, it may be determined to generate a security key independent from a small cell base station added. For example, the condition to generate a security key independent from a small cell base station added may include when a cluster of small cells positioned within a predetermined physical distance is varied or when a timer to generate an independent security key expires (i.e., a predetermined time or more elapses after a previous independent security key is generated).

Figure 14:
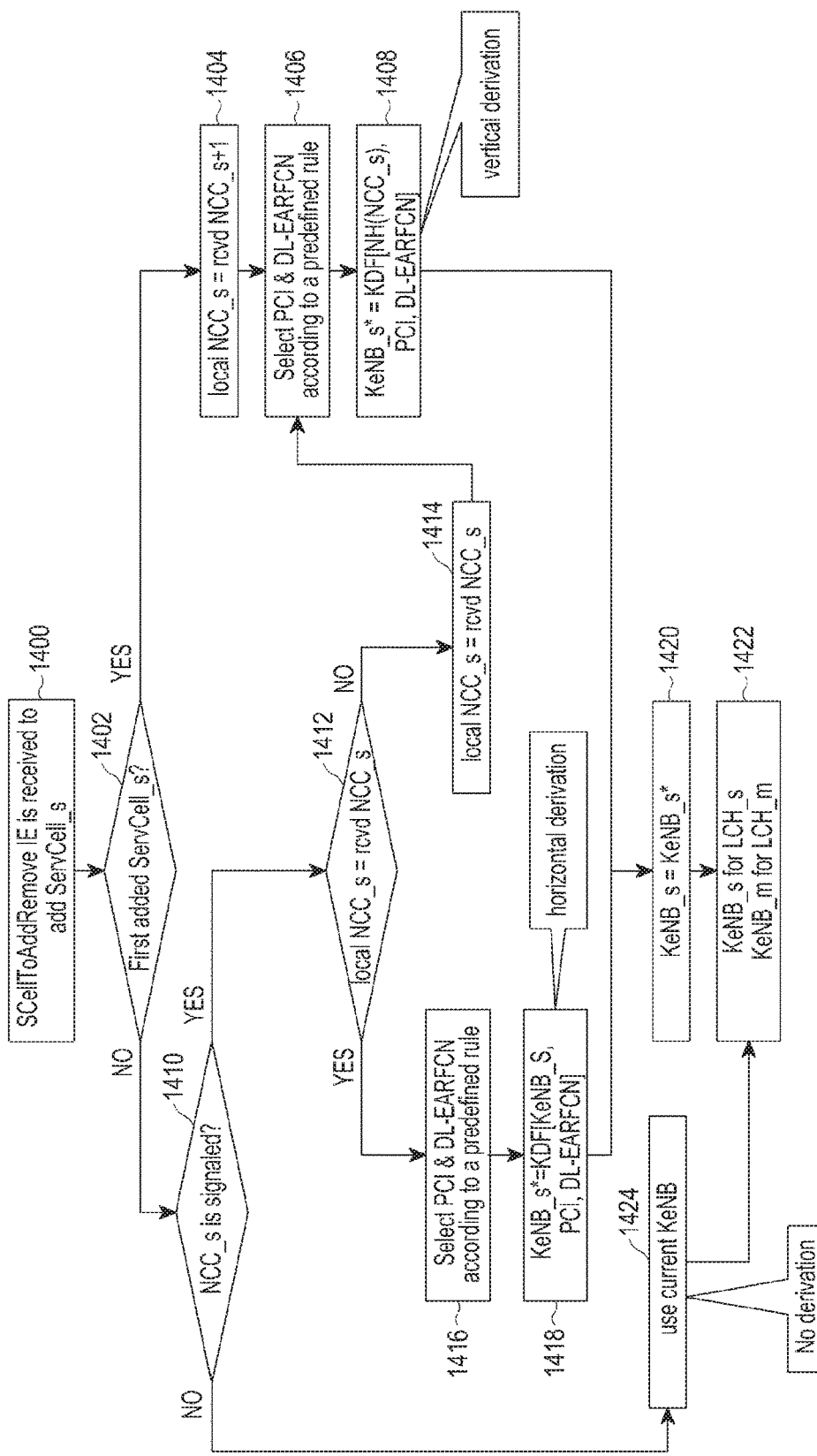
FIG. 14 is a view illustrating an process of generating security keys for a macro cell base station, a small cell base station, and a user terminal and applying the generated security keys when the macro cell base station determines to add a small cell according to an embodiment of the present disclosure.

FIG. 14 is a view illustrating a process of generating security keys for a macro cell base station, a small cell base station, and a user terminal and applying the generated security keys when the macro cell base station determines to add a small cell according to an embodiment of the present disclosure.

Selectively, the small cell base station may be notified that small cell ServCell_s is added by receiving information such as SCellToAddRemove information element (IE) from the macro cell base station (1400). Here, ServCell_s means a serving cell controlled by the small cell base station. For example, the SCellToAddRemove IE may be contained in a small cell add request (SCELL ADD REQUEST) message.

The macro cell base station (or small cell base station or user terminal) determines whether the small cell to be added is a small cell first added (1402). Further, the user terminal may generate a security key for the small cell base station (a security key for a DRB to be added) through operations 1410 and 1412 for determining an NCC value transmitted from the macro cell base station (or small cell base station). That is, different security key generating methods may apply depending on the NCC value transmitted from the base station.

A process of generating and applying a security key is described in detail.

In case as a result of the determination 1402 the small cell is first added, the user terminal sets the sum of the received NCC_s value and one, i.e., NCC_s+1, to a local NCC_s value (1404). Here, NCC_s is an NCC maintained for the security key KeNB_s of the small cell base station. The next hop chaining counter (NCC) may be represented in three bits, and at this time, may be used to distinguish the security keys for eight base stations for one $K_{ASME}$.

The user terminal selects the ID of the macro cell base station, physical cell ID (PCI), and operation frequency, downlink-EUTRAN absolute radio frequency channel number (DL-EARFCN), according to a predetermined rule (1406).

Subsequently, the user terminal may generate a security key KeNB_s* for the small cell base station as in Equation 1 by applying the received NCC_s, the PCI, and the DL_EARFCN to a key derivation function (KDF) (1408).

$$KeNB\_s^* = KDF[NH(NCC\_s), PCI, DL\text{-}EARFCN] \quad \text{Equation 1}$$

Here, NH(NCC_s) is a function to calculate next hop (NH) using NCC_s.

As such, the method of generating a new security key using the NH value to independently maintain the security keys of the macro cell base station and the small cell base station is called vertical security key derivation. That is, when the received NCC value differs from the previous NCC (local NCC), it may be determined to generate a new security key according to the vertical security key derivation method.

If it is determined in 1402 that the small cell is not first added (i.e., when there are one or more small cells already added), the user terminal determines whether the NCC_s has been signaled from the macro cell base station (1410).

In case it is determined in 1410 that the NCC_s has not been signaled, the user terminal may determine to use (recycle) the existing security key of the small cell base station without generating a security key (1424).

Thus, the user terminal applies the security key KeNB_s for a logical channel LCH_s served by the small cell and applies the security key KeNB_m for a logical channel LCH_m served by the macro cell (1422).

Meanwhile, in case it is determined in 1410 that the NCC_s has been signaled, the user terminal determines whether the signaled (received) NCC_S is the same as the local NCC_S (1412).

In case a result of the 1412 determination indicates "the same," the user terminal may select a PCI and DL-EARFCN according to a predetermined rule (1416) and may apply the present security key KeNB_s of the small cell base station, the PCI, and the DL-EARFCN to the key derivation function to generate a security key KeNB_s* for the small cell base station as in Equation 2 (1418).

$$KeNB\_s^* = KDF[KeNB\_s, PCI, DL\text{-}EARFCN] \quad \text{Equation 2}$$

The method of generating a new security key based on an existing base station security key as shown in Equation 2 is called a horizontal security key derivation method. That is, when the received NCC value is the same as the previous NCC (local NCC), it may be determined to generate a new security key according to the horizontal security key derivation method.

In other words, even though the small cell base station (or the macro cell base station) does not receive control information (e.g., NH or NCC) to generate a new security key from the MME, the user terminal generates a new security key based on the existing small cell base station security key. This way may reduce overhead that may be caused by control signaling in the MME due to frequent security key generation tasks.

Unless the result of the 1412 determination indicates "the same," the user terminal sets the received NCC_s value to the local NCC_s value (1414) and performs the selection of PCI and DL-EARFCN (1406) and generation of a key using the NCC_s (1408).

If the security key of the small cell base station is generated through the operation 1418 or 1408, the user terminal sets the generated base station security key KeNB_s* to the new base station security key KeNB_s (1420) and may apply the security key to the logical channel for data transmission (1422).

Selectively, independent security keys respectively for the macro cell base station and the small cell base station may be generated according to a determination by the macro cell or a rule under a particular condition or need. For example, the macro cell base station or the small cell base station (or the user terminal) may operate a security key generation timer to perform management so that if a predetermined time elapses, security keys may be independently and periodically generated or may perform management so that independent security keys may be generated when the number of small cell base stations recycling security keys exceeds a predetermined number.

Figure 15:
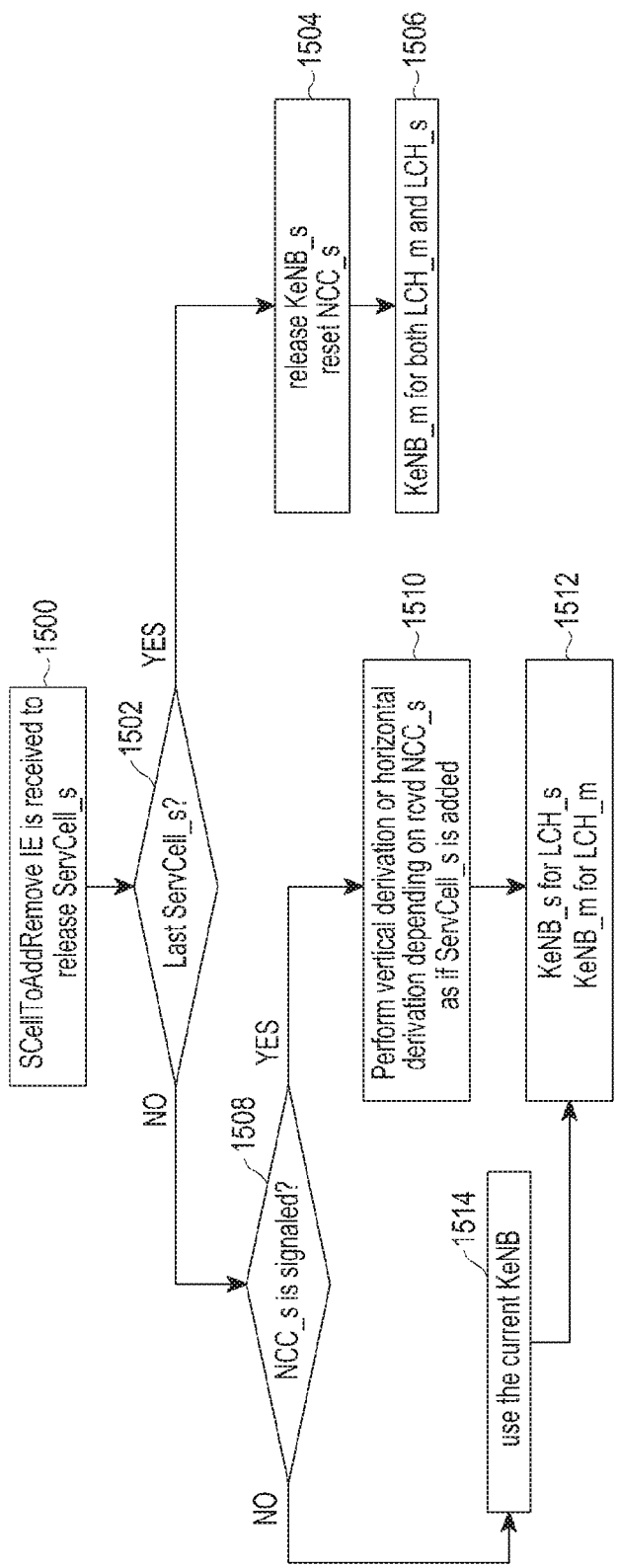
FIG. 15 is a view illustrating an process of generating security keys for a macro cell base station, a small cell base station, and a user terminal and applying the generated security keys when the macro cell base station determines to release or replace a small cell according to an embodiment of the present disclosure.

FIG. 15 is a view illustrating a process of generating security keys for a macro cell base station, a small cell base station, and a user terminal and applying the generated security keys when the macro cell base station determines to release or replace a small cell according to an embodiment of the present disclosure.

Selectively, the small cell base station may be notified that small cell ServCell_s is released by receiving information such as SCellToAddRemove IE from the macro cell base station (1500). For example, the SCellToAddRemove IE may be contained in a small cell release request (SCELL RELEASE REQUEST) message.

The macro cell base station (or small cell base station or user terminal) determines whether the small cell to be released is a small cell released last (1502). Further, the user terminal may determine a base station security key to be used through the operation of determining an NCC value transmitted from the macro cell base station (or the small cell base station). That is, different base station security key applying methods may apply depending on the NCC value transmitted from the base station.

A process of generating and/or applying a security key is described in detail.

In case it is determined in 1502 that the small cell is released last, the user terminal releases the existing security key KeNB_s of the small cell base station and resets (i.e., initializes) the local NCC_s value (1504). Accordingly, the security key of the macro cell base station, KeNB_m, may apply to both the logical channel LCH_m served by the macro cell and the logical channel LCH_s served by the small cell (i.e., the logical channel to replace the released small cell) (1506). Here, although the logical channel when the small cell is released is denoted as LCH_s for convenience, the logical channel LCH_s with the small cell base station released (accordingly not present any longer) should be interpreted to mean a logical channel with the macro cell base station (however it is denoted).

If it is determined in 1502 that the small cell is not released last (i.e., when there are one or more small cells left after the release), the user terminal determines whether the NCC_s has been signaled from the macro cell base station (1508).

In case it is determined in 1508 that the NCC_s has not been signaled, the user terminal does not generate a security key. The user terminal determines to use (i.e., recycle) the existing security key of the small cell base station as a base station security key to replace the released small cell (1514).

In case it is determined in 1508 that the NCC_s has been signaled, the user terminal generates a security key of the small cell base station to replace the released small cell using the vertical security key derivation method or horizontal security key derivation method according to the signaled (or received) NCC_s value similar to when a small cell is added (1510).

If the security key of the small cell base station is determined (generated) according to operation 1514 or 1510, the security key KeNB_m of the macro cell base station applies to the logical channel LCH_m served by the macro cell, and the determined (generated) security key KeNB_s of the small cell base station applies to the logical channel LCH_s served by the small cell (i.e., the logical channel with the base station to replace the released small cell) (1512).

Figure 16A:
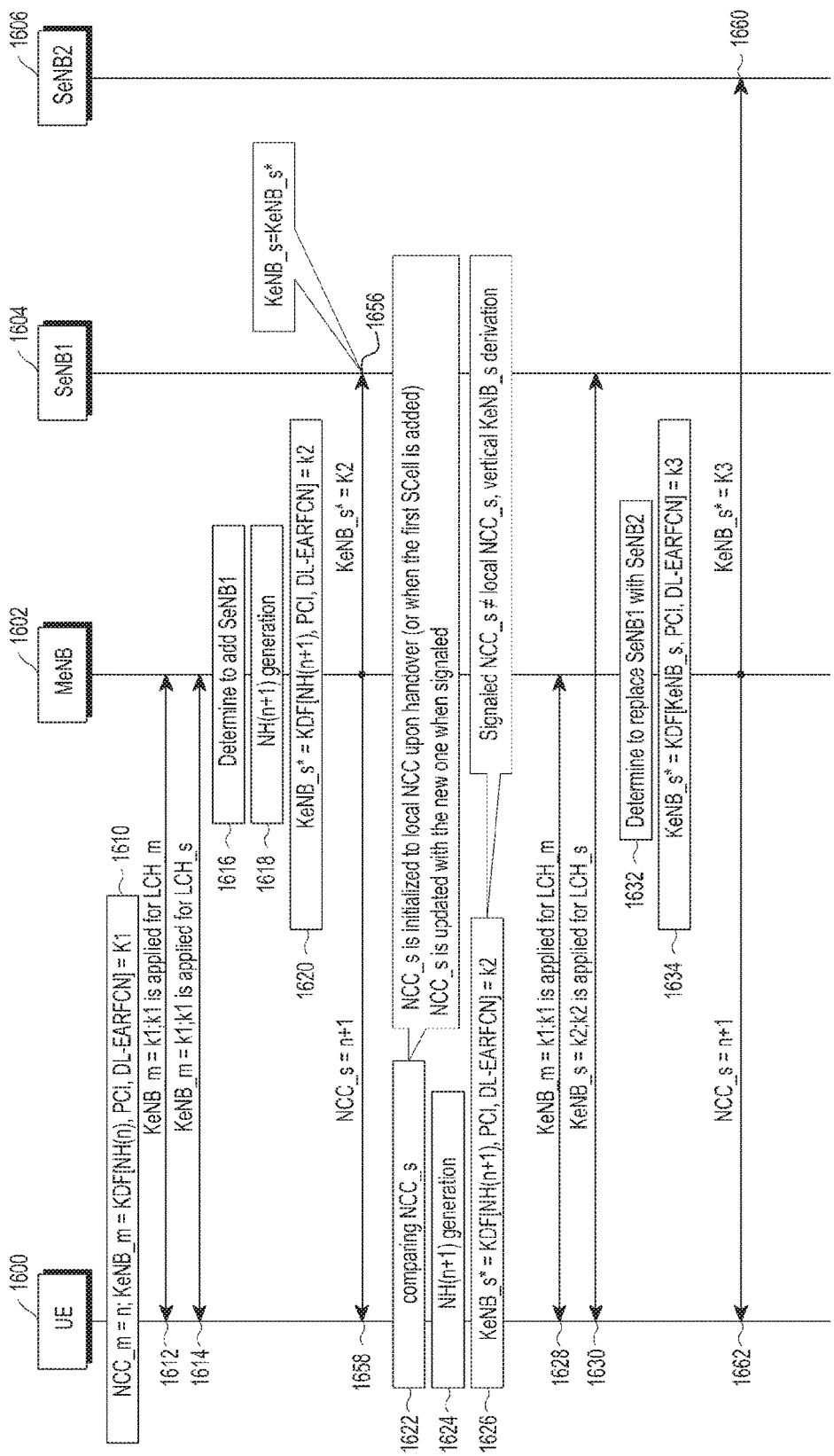
FIGS. 16A and 16B are views illustrating an example of generating and transferring a security key when adding a small cell base station, when changing a small cell base station, and when releasing all of the linked small cells in a dual connectivity environment where the macro cell and the small cells use separated security keys according to an embodiment of the present disclosure.
Figure 16B:
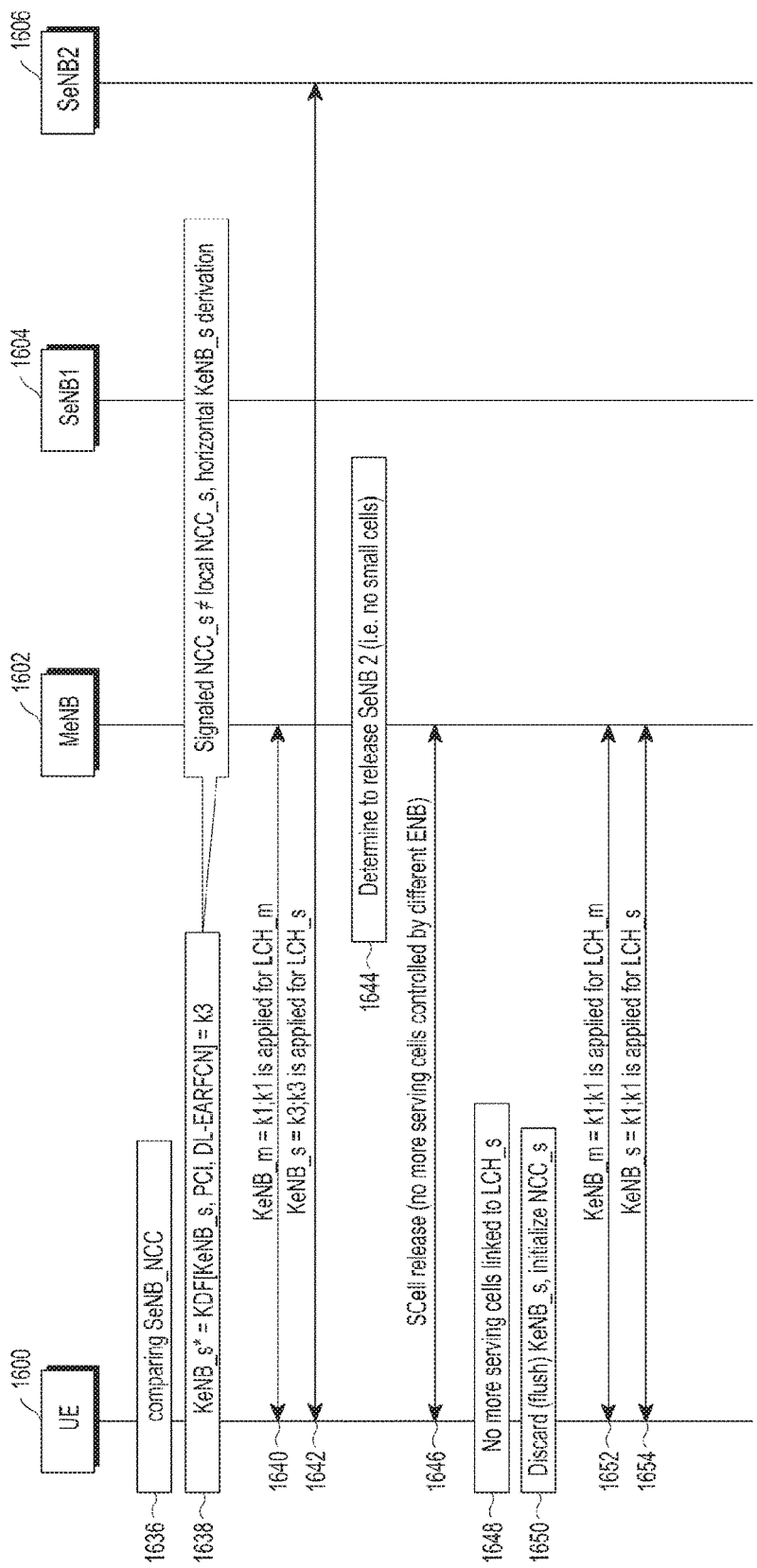

FIGS. 16A and 16B are views illustrating an example of generating and transferring a security key when adding a small cell base station, when changing a small cell base station, and when releasing all of the linked small cells in a dual connectivity environment where the macro cell and the small cells use separated security keys according to an embodiment of the present disclosure.

The embodiment shown in FIGS. 16A and 16B is regarding a scenario in which the user terminal initially receiving two DRBs through the macro cell base station using the security key KeNB of the macro cell base station receives one of the DRBs (referred to as DRB 2 and indicating the LCH_s as shown in FIGS. 16A and 16B) through a small cell base station 1 added and then hands over to a small cell base station 2 for the DRB 2 and finally releases the link with the small cell base station 2 to receive both the DRBs from the macro cell base station.

The security key KeNB_m of the macro cell base station may be obtained, as in Equation 3, using a key derivation function whose input values include the macro cell base station ID, which is the physical cell ID (PCI), the operation frequency, which is the downlink-EUTRAN absolute radio frequency channel number (DL_EARFCN), and the next hop (NH) (1610).

$$KeNB\_m = KDF[NH(n), PCI, DL\text{-}EARFCN] = K1 \qquad \text{Equation 3}$$

Initially, the user terminal 1600 is served two DRBs (DRB 1 indicating LCH_m and DRB 2 indicating LCH_s) by the macro cell base station 1602, and the security key of the macro cell base station is commonly used for the two DRBs (1612 and 1614).

In case a variation in channel status is detected based on a channel measurement report of the user terminal, the macro cell base station 1602 adds a new small cell and determines to connect one (here, DRB 2) of the user DRBs to the small cell base station 1604 (1616). The macro cell base station 1602 generates an NH value for use in vertical security key generation (1618).

At this time, the security key for the new small cell base station 1604 is obtained as in Equation 4 using the KDF whose input values include the PCI, which is the ID of the small cell base station, the DL-EARFCN, which is the operation frequency, and the new NH value (1620). That is, the security key for the new small cell base station 1604 may be generated by the vertical security key derivation method.

$$KeNB\_s^* = KDF[NH(n+1), PCI, DL\text{-}EARFCN] = K2 \qquad \text{Equation 4}$$

Here, n is the value of NCC_m which is an NCC maintained by the security key of the macro cell base station.

If the macro cell base station 1602 transmits the security key KeNB_s* generated for the small cell base station to the small cell base station (1656), the small cell base station applies the received KeNB_s* as a security key of the new base station.

The macro cell base station transmits the NCC_s information to the user terminal 1600 as well (1658). The user terminal 1600 may restore (generate) and use the security key KeNB_s* for the DRB 2 connected to the small cell base station 1 1604 based on the received NCC_s.

Specifically, the user terminal 1600 makes comparison as to the received NCC_s (1622). The NCC_s is initialized to the local NCC when handover occurs (or the initial small cell is added), and in case the new NCC_s value is signaled, it is updated with the received NCC_s value. When the received NCC_s value differs from the local NCC_s value, the user terminal 1600 may generate an NH with the received NCC_s value (1624) and may generate a value K2 of the security key KeNB_s of the small cell base station using the PCI and the DL-EARFCN values (1626). Then, the security key KeNB_m may apply to DRB 1 (1628), and the security key KeNB_s may apply to DRB 2 (1630).

Next, the channel condition changes, and the macro cell base station 1602 determines to switch (i.e. handover) the DRB 2 connection of the user terminal 1600 from the small cell base station 1 1604 to the new small cell base station 2 1606 (1632). At this time, the security key for the small cell base station 2 1606 is obtained as in Equation 5 using the key derivation frequency (KDF) based on the PCI, which is the ID of the small cell base station 2 1606, the operation frequency DL-EARFCN, and the security key KeNB_s of the previous small cell base station. That is, the security key for the replacing small cell base station 1606 may be generated by the horizontal security key derivation method (1634).

$$KeNB\_s^* = KDF[KeNB\_s, PCI, DL\text{-}EARFCN] = K3 \qquad \text{Equation 5}$$

The macro cell base station 1602 may transmit the security key KeNB_s* (K3) generated for the small cell base station 2 1606 to the small cell base station 2 1606 (1660). Further, the macro cell base station 1602 transmits the NCC_s information to the user terminal 1600 as well (1662). The user terminal 1600 may make comparison as to the received NCC_s (, SeNB_NCC), and restore (generate) and use the security key KeNB_s* for the DRB 2 connected to the small cell base station 2 1606 based on the NCC_s (1636 and 1638). As a result, the user terminal may apply the base station security keys for DRB 1 and DRB 2 (1640 and 1642).

Next, the channel condition changes, and if the macro cell base station 1602 determines to release the DRB 2 which is the connection of the user terminal 1600 to the small cell base station 2 1606 and to connect the same to the macro cell base station 1602 (hand over) (1644), the macro cell base station 1602 transmits a small cell release (SCELL RELEASE) message to the user terminal 1600 (1646).

When releasing the last small cell base station (1648) (i.e., when there is no more serving cell to be linked to the LCH_s), the macro cell base station 1602 discards the security key KeNB_s of the small cell base station 2 that has been used and resets the NCC_s (1650). It performs transmission with the security key KeNB_m (k1) of the macro cell base station 1602 applied to DRB 2 as well as DRB 1 (1652 and 1654).

Figure 17A:
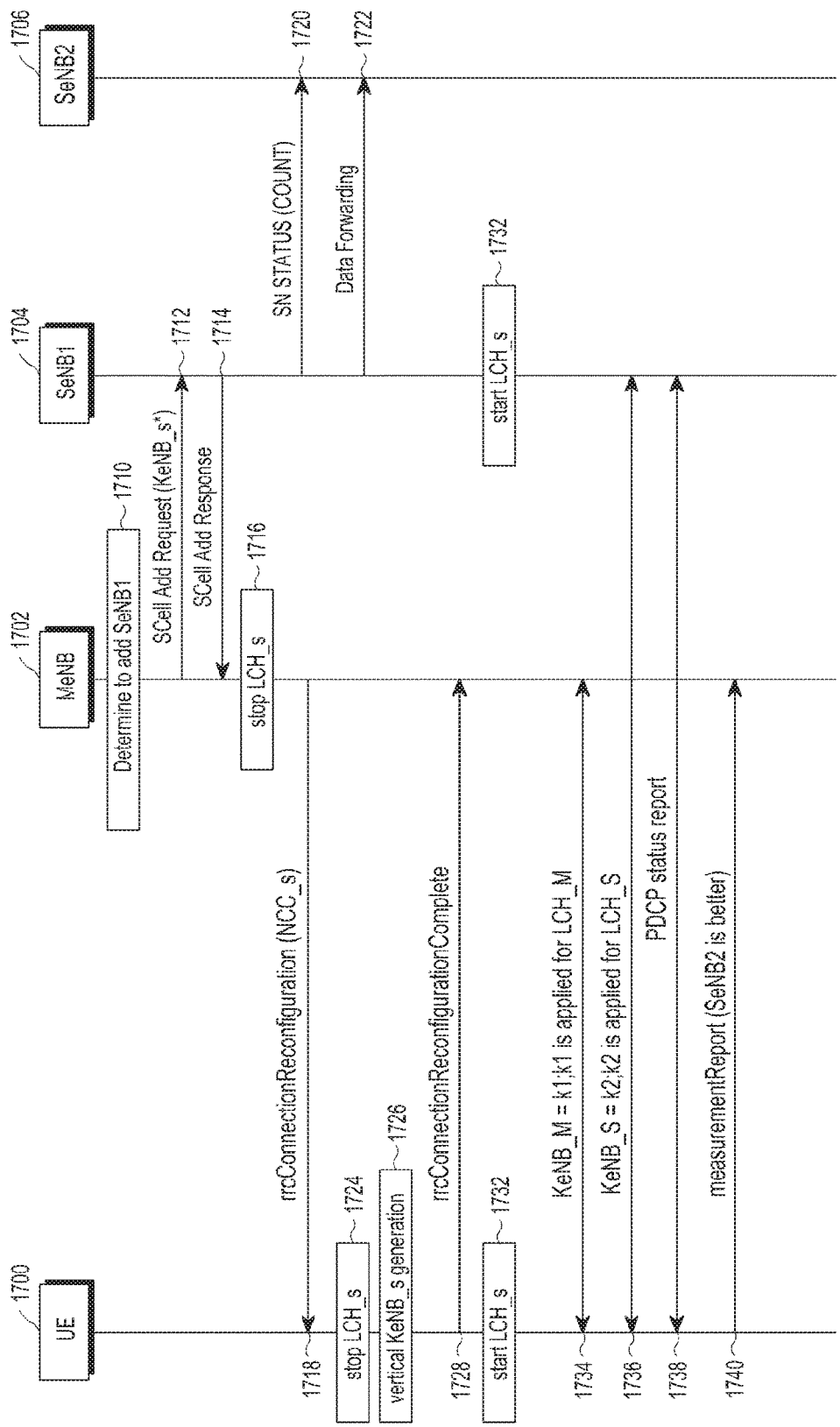
FIGS. 17A and 17B are views illustrating an example of establishing a data radio bearer (DRB) path and generating and transmitting a security key on the control plane and user plane when adding a small cell base station, when changing a small cell base station, and when releasing all of the linked small cells in a dual connectivity environment where the macro cell and the small cells use separated security keys according to an embodiment of the present disclosure.
Figure 17B:
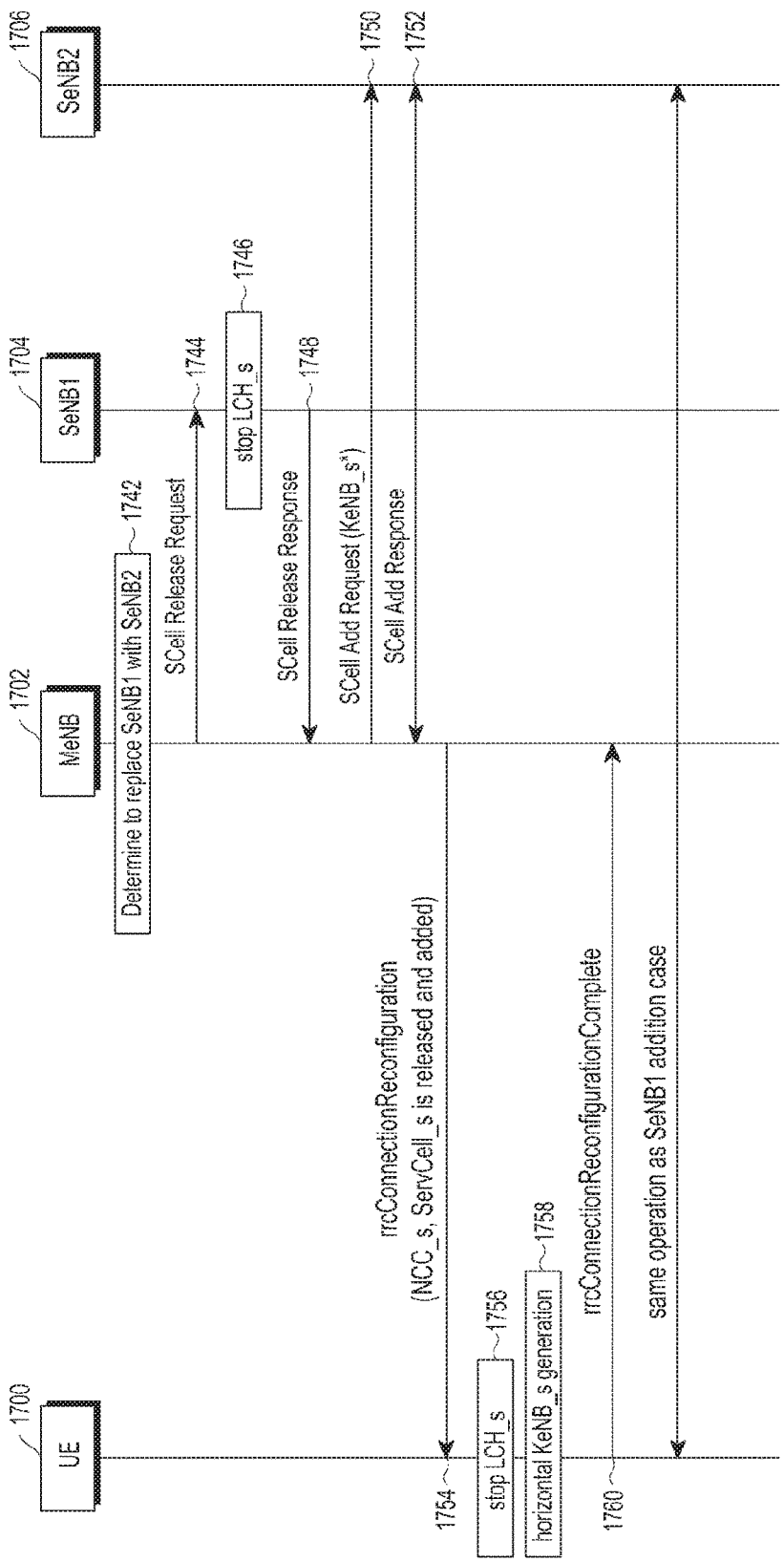

FIGS. 17A and 17B are views illustrating an example of establishing a DRB path and generating and transmitting a security key on the control plane and user plane when adding a small cell base station, when changing a small cell base station, and when releasing all of the linked small cells in a dual connectivity environment where the macro cell and the small cells use separated security keys according to an embodiment of the present disclosure.

The embodiment shown in FIGS. 17A and 17B is also regarding a scenario in which the user terminal initially receiving two DRBs through the macro cell base station using the security key KeNB of the macro cell base station receives one of the DRBs (referred to as DRB 2 and indicating the LCH_s as shown in FIGS. 17A and 17B) through a small cell base station 1 added and then hands over to a small cell base station 2 for the DRB 2.

In case the user terminal 1700 which has initially been connected with the macro cell base station 1702 alone determines to add a small cell base station to receive a service (1710), the macro cell base station 1702 transmits a small cell add request to the small cell base station 1704 while generating and forwarding a security key KeNB_s* (1712). The small cell base station 1 1704 responds to the request 1712 (1714). The macro cell base station 1702 transmits a sequence number status transfer (SN STATUS TRANSFER) message including a COUNT value to the small cell base station 1704 (1720), and forwards user data to be transmitted to the user terminal to the small cell base station 1704 (1722).

The macro cell base station 1702 stops the logical channel LCH_s through which the user terminal 1700 connects to the macro cell base station 1702 (1716) and transmits an RRC reconfiguration message for connection with the small cell base station 1 1704 and the user terminal 1700 to the user terminal 1700 while informing the user terminal 1700 of the NCC_s information (1718).

The user terminal 1700 stops the logical channel LCH_s connecting with the macro cell base station (1724) and generates the KeNB_s based on the NCC_s information and applies the same to the DRB 2 (1726). Here, although the logical channel through which the user terminal communicates with the macro cell base station is denoted LCH_s for convenience, the LCH_s when the communication with the macro cell base station is stopped for communicating with a new small cell base station should be interpreted to mean a logical channel with the macro cell base station (regardless of however it is denoted).

Subsequently, the user terminal 1700 sends an RRC reconfiguration complete message to the macro cell base station 1702 (1728). The user terminal 1700 starts to transmit DRB 2 with the small cell base station 1704 (1732). In this case, the security key KeNB_s applies for a logical channel LCH_s served by the small cell, and the security key KeNB_m applies for a logical channel LCH_m served by the macro cell (1734 and 1736).

Selectively, PDCP status reporting 1738 may occur between the user terminal 1700 and the small cell base station 1704, and radio environment measurement reporting 1740 may occur from the user terminal 1700 to the macro cell base station 1702.

Next, in case the macro cell base station 1702 determines to change the small cell base station to be used for DRB 2 from the small cell base station 1 1704 to the small cell base station 2 1706 (1742), the macro cell base station 1702 sends a request message to release the small cell base station 1 1704 to the small cell base station 1 1704 (1744). At this time, the small cell base station 1 1704 stops transmitting the DRB 2 (1746) and sends a response to the request message 1744 to the macro cell base station 1702 (1748). At this time, the macro cell base station 1702 may generate and transfer the security key KeNB_s* while sending a request to add a small cell to the small cell base station 2 1706 (1750). The small cell base station 2 1706 responds to the add request 1750 (1752).

The macro cell base station 1702 performs RRC reconfiguration for connection with the new small cell base station 2 1706 and the user terminal 1700 (1754 and 1760). The macro cell base station 1702 may pass the NCC_s over while sending the RRC connection reconfiguration message 1754 to the user terminal 1700. The user terminal 1700 stops the logical channel LCH_s for DRB 2 (1756), generates a new small cell base station security key KeNB_s* (i.e., a horizontal base station security key) based on the received NCC_s, and applies the same to the DRB 2 (1758).

Figure 18:
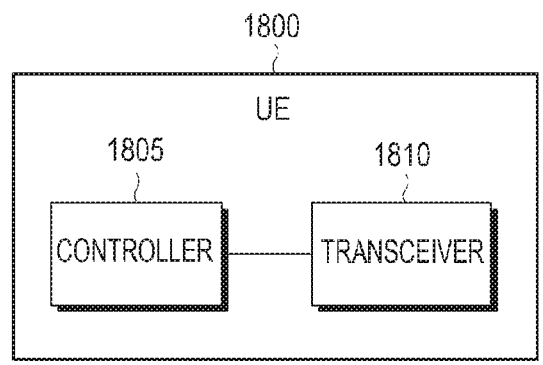
FIG. 18 is a view illustrating a configuration of a user terminal according to an embodiment of the present disclosure.

FIG. 18 is a view illustrating a configuration of a user terminal according to an embodiment of the present disclosure.

The UE 1800 includes a transceiver 1810 to communicate signals and a controller 1805 to control the overall operation of the UE 1800. The transceiver 1810 may play a role to communicate various control signals and data with a macro cell base station or a small cell base station. The operations of the user terminal as exemplified herein may be appreciated as performed under the control the controller 1805.

Although the transceiver 1810 and the controller 1805 are shown as if they are separate components, they may also be implemented in a single component.

Figure 19:
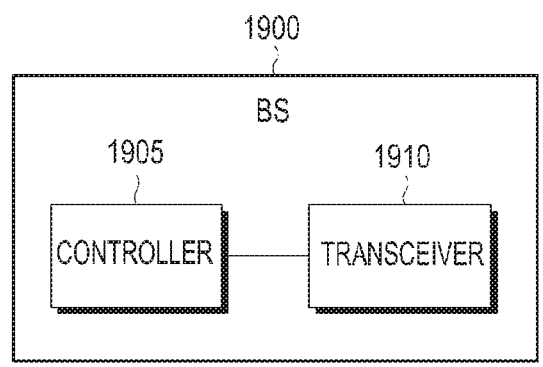
FIG. 19 is a view illustrating a configuration of a base station according to an embodiment of the present disclosure.

FIG. 19 is a view illustrating a configuration of a base station according to an embodiment of the present disclosure.

The base station 1900 is an example of a macro cell base station or small cell base station as described herein.

The base station 1900 includes a transceiver 1910 to communicate signals and a controller 1905 to control the overall operation of the base station 1900. The transceiver 1910 may play a role to communicate various control signals and data with a user terminal or a small cell base station. The operations of the macro cell base station or small cell base station as exemplified herein may be appreciated as performed under the control the controller 1905.

Although the transceiver 1910 and the controller 1905 are shown as if they are separate components, they may also be implemented in a single component.

It should be noted that examples of inter-system signal transfer, generation of security keys, and configuration of the apparatus as illustrated in FIGS. 3 to 19 are not intended to limit the scope of the present disclosure. In other words, all the entities, operations or components illustrated in FIGS. 3 to 19 should not be construed as essential components to practice the present disclosure, and the present disclosure may be rather implemented with only some of the components without departing from the gist of the present disclosure.

The above-described operations may be realized by equipping a memory device retaining their corresponding codes in the entity, base station, or user terminal of the communication system. That is, the controller in the entity, the base station, or user terminal may execute the above-described operations by reading and executing the program codes stored in the memory device by a processor or central processing unit (CPU).

As described herein, various components or modules in the entity, the base station, or the user terminal may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for communicating by a user equipment (UE) in a communication system, the method comprising:
receiving a radio resource control (RRC) connection reconfiguration message including a counter for a second base station from a first base station;
generating a second security key for a second communication link with the second base station based on a first security key and the counter, the first security key being applied to a first communication link with the first base station; and
applying the second security key to the second communication link with the second base station.

2. The method of claim 1, further comprising:
generating an encryption key; and
communicating data through the second communication link with the second base station,
wherein the encryption key is used for encrypting the data.

3. The method of claim 2, wherein, before the communicating of the data, the method further comprises:
transmitting a RRC reconfiguration complete message to the first base station; and
performing a random access procedure with the second base station.

4. The method of claim 1,
wherein the RRC connection reconfiguration message including the counter is received when the second base station is newly added in the communication network, and
wherein the counter is a next hop chaining counter (NCC) for the second base station.

5. The method of claim 4, wherein the generated second security key is a new security key for the newly added second base station.

6. The method of claim 1,
wherein the generating of the second security key further comprises increasing the counter, and
wherein the second security key is generated by applying the first security key and the counter to a key derivation function (KDF).

7. A user equipment (UE) communicating in a communication system, the UE comprising:
a transceiver; and
a controller configured to:
receive a radio resource control (RRC) connection reconfiguration message including a counter for a second base station from a first base station;
generate a second security key for a second communication link with the second base station based on the first security key and the counter, the first security key being applied to a first communication link with the first base station; and
apply the second security key to the second communication link with the second base station.

8. The UE of claim 7,
wherein the controller is further configured to generate an encryption key,
wherein the transceiver is further configured to communicate data through the second communication link with the second base station under control of the controller, and
wherein the encryption key is used for encrypting the data.

9. The UE of claim 7, wherein the controller is further configured to:
transmit a RRC reconfiguration complete message to the first base station; and
perform a random access procedure with the second base station.

10. The UE of claim 7,
wherein the RRC connection reconfiguration message including the counter is received when the second base station is newly added in the communication network, and
wherein the counter is a next hop chaining counter (NCC) for the second base station.

11. The UE of claim 10, wherein the generated second security key is a new security key for the newly added second base station.

12. The UE of claim 7,
wherein the controller configured to increase the counter, and
wherein the second security key is generated by applying the first security key and the counter to a key derivation function (KDF).

13. A method for communicating by a second base station in a communication system, the method comprising:
receiving, from a first base station, a second security key to be used for a second communication link with a user equipment (UE);
applying the second security key to the second communication link with the UE,
wherein the second security key is generated based on a counter and a first security key to be used for a first communication link with the first base station, and
wherein the counter is included in a radio resource control (RRC) connection reconfiguration message.

14. A method of claim 13, further comprising:
generating an encryption key; and
communicating data through the second communication link with the UE,
wherein the encryption key is used for encrypting the data.

15. The method of claim 14, wherein, before the communicating of the data, the method further comprises:
performing a random access procedure with the UE.

16. The method of claim 13,
wherein the RRC connection reconfiguration message including the counter is received when the second base station is newly added in the communication network, and
wherein the counter is a next hop chaining counter (NCC) for the second base station.

17. The method of claim 16, wherein the generated second security key is a new security key for the newly added second base station.

18. A second base station communicating in a communication system, the second base station comprising:
a transceiver; and
a controller configured to:
receive, from a first base station, a second security key to be used for a second communication link with a user equipment (UE); and
apply the second security key to the second communication link with the UE;
wherein the second security key is generated based on a counter and a first security key to be used for a first communication link with the first base station, and
wherein the counter is included in a radio resource control (RRC) connection reconfiguration message.

19. The second base station of claim 18, wherein the controller is further configured to generate an encryption key, wherein the transceiver is further configured to communicate data through the second communication link with the UE under control of the controller, and wherein the encryption key is used for encrypting the data.

20. The second base station of claim 18, wherein the controller is configured to:

perform a random access procedure with the UE.

21. The second base station of claim 18, wherein the RRC connection reconfiguration message including the counter is received when the second base station is newly added in the communication network, and wherein the counter is a next hop chaining counter (NCC) for the second base station.

22. The second base station of claim 21, wherein the generated second security key is a new security key for the newly added second base station.

* * * * *